United States Patent
Morita et al.

[11] Patent Number: 6,005,586
[45] Date of Patent: Dec. 21, 1999

[54] DRAWING PROCESSING APPARATUS

[75] Inventors: Masao Morita; Kazuto Hayashi, both of Ashigarakami-gun, Japan

[73] Assignee: Fuji Xerox Co., Ltd., Tokyo, Japan

[21] Appl. No.: 08/989,900

[22] Filed: Dec. 12, 1997

[30] Foreign Application Priority Data

Feb. 17, 1996 [JP] Japan ................................. 8-353678

[51] Int. Cl.⁶ ................................................. G06F 15/00
[52] U.S. Cl. ................................................. 345/434
[58] Field of Search .................................. 345/434, 441, 345/443, 118, 121

[56] References Cited

U.S. PATENT DOCUMENTS 5,745,121   4/1998   Politis ................................. 345/434

FOREIGN PATENT DOCUMENTS

| 63-198174 | 8/1988 | Japan . |
| 63-245576 | 10/1988 | Japan . |
| 1-103784 | 4/1989 | Japan . |
| 4-282784 | 10/1992 | Japan . |
| 6-168337 | 6/1994 | Japan . |
| 6-168339 | 6/1994 | Japan . |
| 6-168872 | 6/1994 | Japan . |
| 6-274643 | 9/1994 | Japan . |
| 8-17817 | 1/1996 | Japan . |
| 9-220505 | 8/1997 | Japan . |

*Primary Examiner*—Phu K. Nguyen
*Attorney, Agent, or Firm*—Oliff & Berridge, PLC

[57] ABSTRACT

A drawing processing apparatus has a drawing data input section 2 for receiving the drawing data to be drawn. A drawing data determination section 3 determines the drawing data type from the drawing data input to the drawing data input section 2 and passes the drawing data having an outline shape to a vector generation section 4 and a drawing attribute processing section 5 and the drawing data having no outline shape to the drawing attribute processing section 5 according to the drawing data type. The vector generation section 4 prepares a vector representing an outline shape from the drawing data received from the drawing data determination section 3. The drawing attribute processing section 5 gets different drawing attributes for each drawing data type from the drawing data passed from the drawing data determination section 3 and performs processing as required.

22 Claims, 29 Drawing Sheets

FIG. 2

DRAWING COMMANDS

CLIP SET: | ID | CLIPSET | DETERMINATION RULE | POINT 1 | ... | POINT n |

CLIP CLEAR: | ID | CLIP CLEAR | CLEAR ID |

FILL: | ID | FILL | DETERMINATION RULE | COLOR | POINT 1 | ... | POINT n |

FINE LINE: | ID | STROKE | COLOR | POINT 1 | POINT 2 |

FIG. 3

DRAWING COMMAND TYPES

| COMMAND TYPE | DESCRIPTION |
| --- | --- |
| CLIPSET | SET CLIP |
| CLIPCLEAR | CLEAR CLIP |
| FILL | FILL |
| STROKE | FINE LINE |

FIG. 4

DETERMINATION RULE TYPES

| DETERMINATION RULE | DESCRIPTION |
| --- | --- |
| NZ | WINDING RULE |
| EO | ODD-EVEN RULE |

COORDINATE SYSTEM
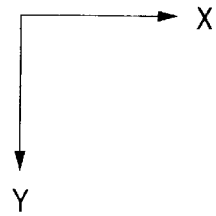
FIG. 7A
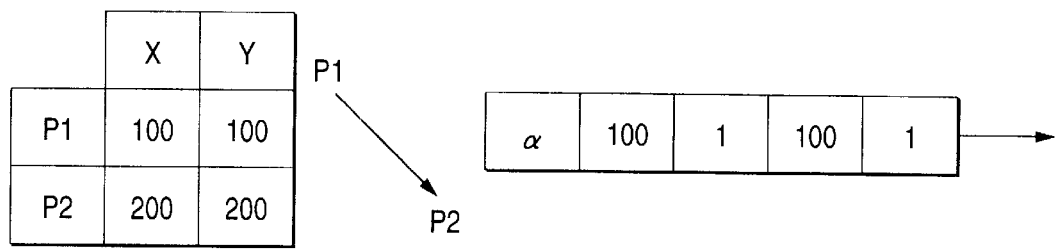
FIG. 7B
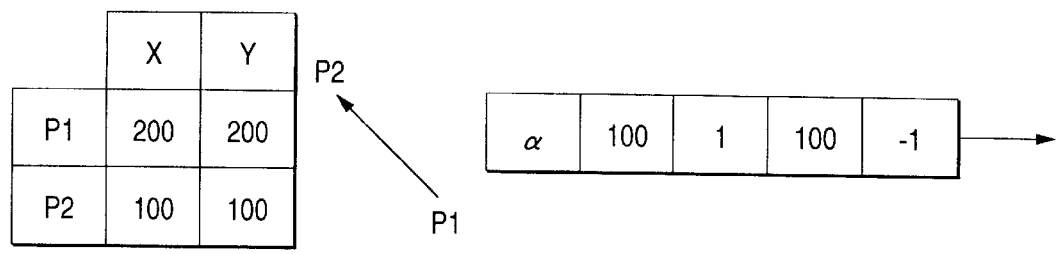

FIG. 8
DRAWING ATTRIBUTES FOR EACH COMMAND TYPE
| COMMAND TYPE | DRAWING ATTRIBUTES |
|---|---|
| CLIP SET | C L I P S E T, DETERMINATION RULE |
| CLIP CLEAR | NONE |
| FILL | F I L L, DETERMINATION RULE, COLOR |
| FINE LINE | S T R O K E, COLOR |
FIG. 9
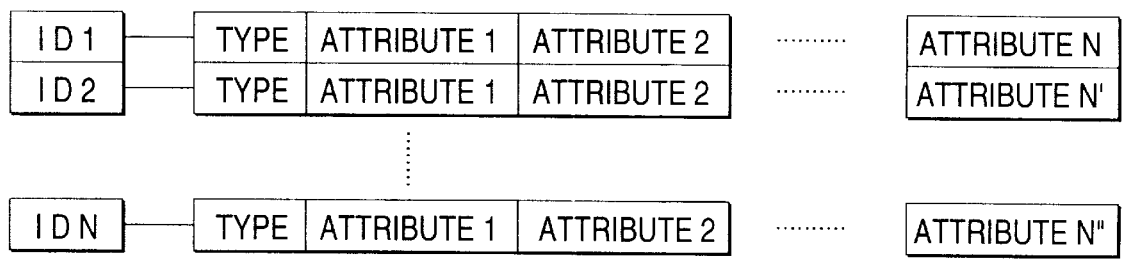
FIG. 10A
CLIP SET COMMAND
FIG. 10B
FILL COMMAND
FIG. 10C
FINE LINE COMMAND

FIG. 11A
| ID | DRAWING TYPE |
|----|--------------|
| a | CLIP A SET |
| b | CLIP B SET |
| c | CLIP A CLEAR |
| d | CLIP C SET |
| e | CLIP C CLEAR |
| f | CLIP B CLEAR |
FIG. 11B
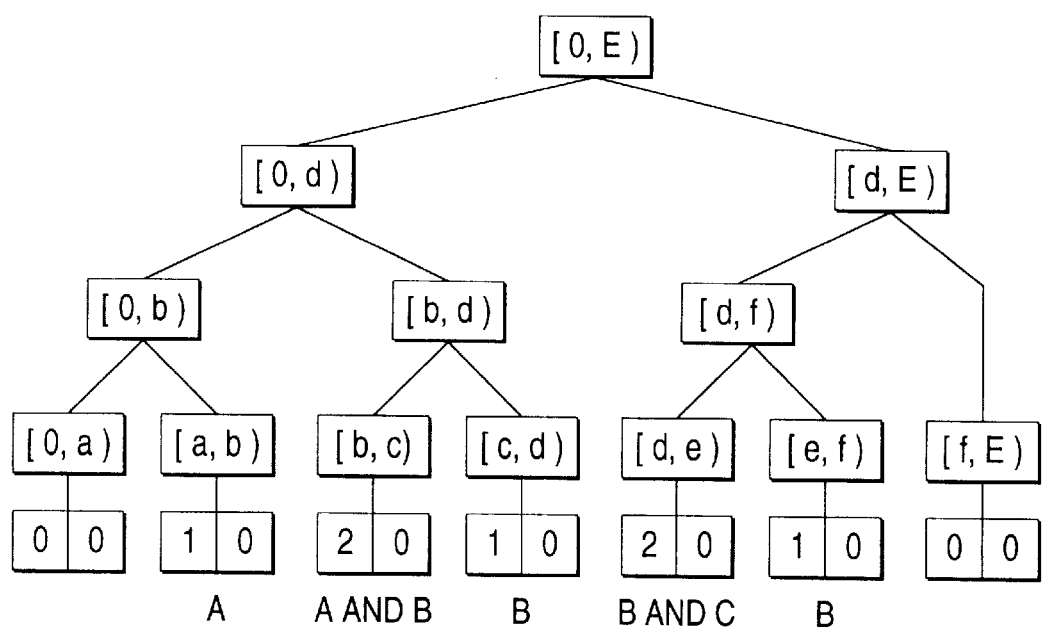
FIG. 11C
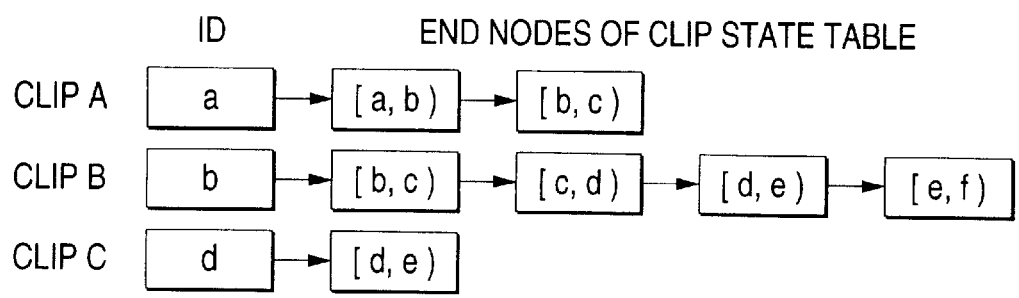

FIG. 23
ACTIVE TABLE
DRAWING TABLE
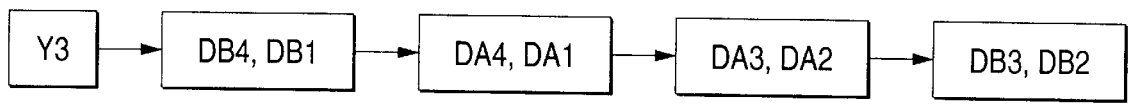
CLIP TABLE
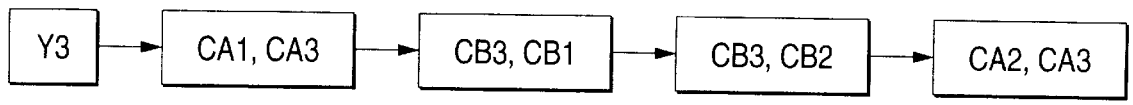
FIG. 24
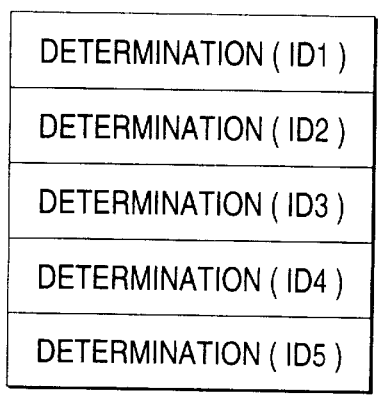

FIG. 36A
| ID | DRAWING TYPE |
|---|---|
| a | CLIP A SET |
| b | CLIP B SET |
| c | CLIP A CLEAR |
| d | CLIP C SET |
| e | CLIP C CLEAR |
| f | CLIP B CLEAR |
FIG. 36B
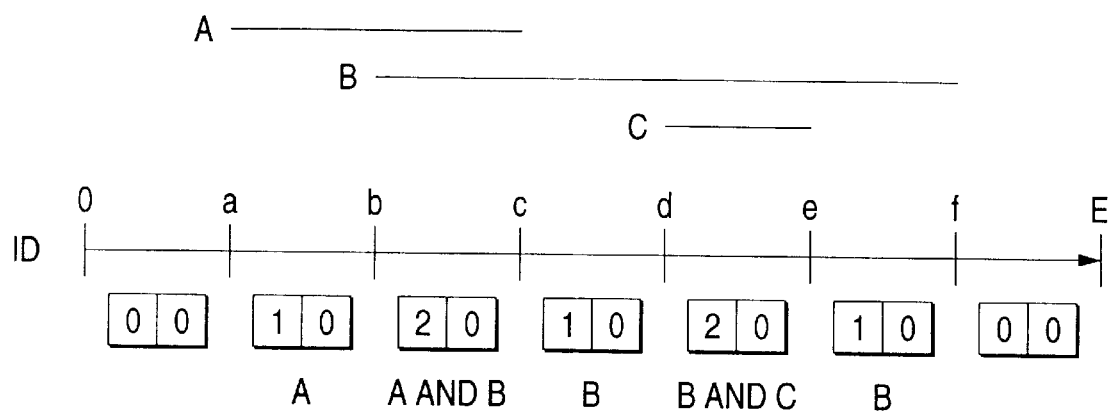
FIG. 37
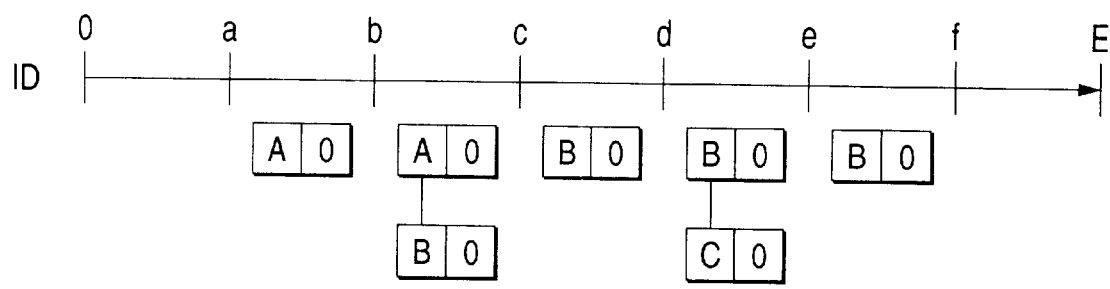

| ID | DRAWING TYPE |
|---|---|
| a | CLIP A SET |
| b | CLIP B SET |
| c | CLIP C SET |
| d | CLIP C CLEAR |
| e | CLIP B CLEAR |
| f | CLIP A CLEAR |

FIG. 39

| CLIP | CID | CLIP | CID | DETERMINATION RULE | PATH |
|---|---|---|---|---|---|
| FILL | ID | FILL | CID | COLOR | DETERMINATION RULE | PATH |

FIG. 40

INPUT ORDER

| C1 | CLIP | × | NZ | PATH 1 |
| ID1 | FILL | C1 | COLOR 1 | NZ | PATH 2 |
| C2 | CLIP | C1 | NZ | PATH 3 |
| ID2 | FILL | C2 | COLOR 2 | EO | PATH 4 |
| ID3 | FILL | C2 | COLOR 3 | EO | PATH 5 |
| C3 | CLIP | C2 | NZ | PATH 6 |
| ID4 | FILL | C3 | COLOR 4 | NZ | PATH 7 |
| ID5 | FILL | C1 | COLOR 5 | NZ | PATH 8 |
| C4 | CLIP | C1 | NZ | PATH 9 |
| ID6 | FILL | C4 | COLOR 6 | EO | PATH 10 |

FIG. 41A

| ID1 | FILL | C1 | COLOR 1 | NZ |
|-----|------|----|---------|----|
| ID2 | FILL | C2 | COLOR 2 | EO |
| ID3 | FILL | C2 | COLOR 3 | EO |
| ID4 | FILL | C3 | COLOR 4 | NZ |
| ID5 | FILL | C1 | COLOR 5 | NZ |
| ID6 | FILL | C4 | COLOR 6 | EO |

FIG. 41B

| C1 | ✕  | NZ |
|----|----|----|
| C2 | C1 | NZ |
| C3 | C2 | NZ |
| C4 | C1 | NZ |

FIG. 41C

| C1 | 1 | 0 |
|----|---|---|
| C2 | 2 | 0 |
| C3 | 3 | 0 |
| C4 | 2 | 0 |

FIG. 41D

| C1 | C2 | C3 | C4 |
|----|----|----|----|
| C2 | C3 |    |    |
| C3 | ✕  |    |    |
| C4 | ✕  |    |    |

DRAWING PROCESSING APPARATUS

BACKGROUND OF THE INVENTION

This invention relates to an image processing apparatus or a drawing processing apparatus and in particular to a drawing processing apparatus for clipping and filling a plurality of clip areas of any shapes.

A drawing processing apparatus in computer graphics (CG), desk-top publishing (DTP), or the like can perform either or both of clipping of producing partial display of input image data, text data, etc., and filling of coloring the inside of a predetermined area, as required.

In some clipping, only rectangular areas can be handled as graphic form clip areas and in some clipping, areas of any shapes can be handled. In the clipping of handling only rectangular areas as clip areas, generally all intersection points of a drawing element and a rectangular area of a clip area are found and the inside or outside is determined, then only the clip area is displayed. Techniques based on such clipping are disclosed in the Unexamined Japanese Patent Application Publication Nos. Hei 1-103784, Sho 63-245576, and Sho 63-198174.

On the other hand, when areas of any shapes are frequently clipped as in CG or DTP, the number of intersection points of a drawing element and a clip area extremely increases. Therefore, if the above-described clipping method is used, the time consumed for determining the inside or outside of the clip area becomes enormous and the time taken in the clipping increases. As disclosed in the Unexamined Japanese Patent Application Publication No. Hei 6-168339, when a line having thickness is drawn, it becomes a graphic form of a complicated outline shape involving graphic forms at the end points and the connection points, so that the clipping time furthermore grows.

Then, a method of using an edge list to perform clipping is disclosed in the Unexamined Japanese Patent Application Publication No. Hei 6-274643. The edge list is used, whereby intersection processing is simplified as processing for each scan line and clipping can be performed at high speed.

However, the clipping method using an edge list involves a first problem of taking time in merging the processing results and a second problem of 2-step and complicated processing because filling is performed on a display list and then clipping is performed.

Another clipping method of graphic forms with vectors is disclosed in the Unexamined Japanese Patent Application Publication No. Hei 4-282784. In this method, however, only cases where graphic forms and clip areas are provided in a one-to-one correspondence with each other are considered for clipping. Thus, to process a plurality of clip areas, it becomes necessary to merge the processing results on a page memory, etc.,; still much time is taken in the merging.

SUMMARY OF THE INVENTION

It is therefore an object of the invention to provide a drawing processing apparatus that can execute clipping of a clip area consisting of a plurality of any shapes at high speed at the same time as filling.

To the end, according to the invention, there is provided a drawing processing apparatus comprising a vector generation section for preparing drawing vectors representing an outline shape and clip vectors from drawing data to be drawn, a drawing attribute processing section for getting drawing attributes from the drawing data to be drawn and preparing a correspondence table indicating which of the clip vectors each of the drawing vectors is clipped with, and a filling and clipping section for reading the prepared drawing vectors and clip vectors for each scan line and performing filling and clipping based on the correspondence table.

To the end, according to another aspect of the invention, there is provided a drawing processing apparatus comprising a vector generation section for preparing from a drawing command containing an ID representing the drawing order and a point string determining an outline shape, drawing vectors and clip vectors each containing the ID and the value of an X intercept on a scan line, a drawing attribute processing section for preparing a correspondence table indicating which of the clip vectors each of the drawing vectors is clipped with, a vector getting section for getting a vector string crossing one scan line from the drawing vectors and the clip vectors, and a filling and clipping section for determining the drawing start and end positions on the one scan line based on the correspondence table and the X intercept values of the drawing and clip vectors in the vector string and performing filling and clipping.

Thus, in the invention, filling and clipping are executed in the vector state for decreasing the number of processing steps and skipping merging taking much time.

BRIEF DESCRIPTION OF THE DRAWINGS

In the accompanying drawings:

FIG. 2 is an illustration to show the formats of drawing commands;

FIG. 3 is an illustration to explain the types of drawing commands;

FIG. 4 is an illustration to explain inside determination rules of drawing commands;

FIGS. 7A and 7B are illustration to specifically explain the vector shown in FIG. 6;

FIG. 8 is an illustration to show drawing attributes for each drawing command type;

FIG. 9 is an illustration to of the drawing attributes managed in a drawing attribute storage section 9;

FIGS. 10A to 10C are illustration to explain the drawing attributes for each drawing command type;

FIGS. 11A to 11C are illustration to explain a clip state table and a clip scope table;

FIG. 23 is an illustration to explain an active vector table;

FIG. 24 is an illustration to explain an inside determination table used to determine the inside state of a graphic form when filling and clipping are performed;

FIGS. 36A and 36B shows a list structure.

FIG. 37 shows a list format.

FIG. 39 shows the relation between a drawing object and a clip object.

FIG. 40 shows input data.

FIGS. 41A to 41D show an attribute tables.

DETAILED DESCRIPTION OF THE PREFERRED EMBODIMENTS

A drawing processing apparatus as one preferred embodiment of the invention will be discussed with reference to FIGS. 1 to 41.

Figure 1:
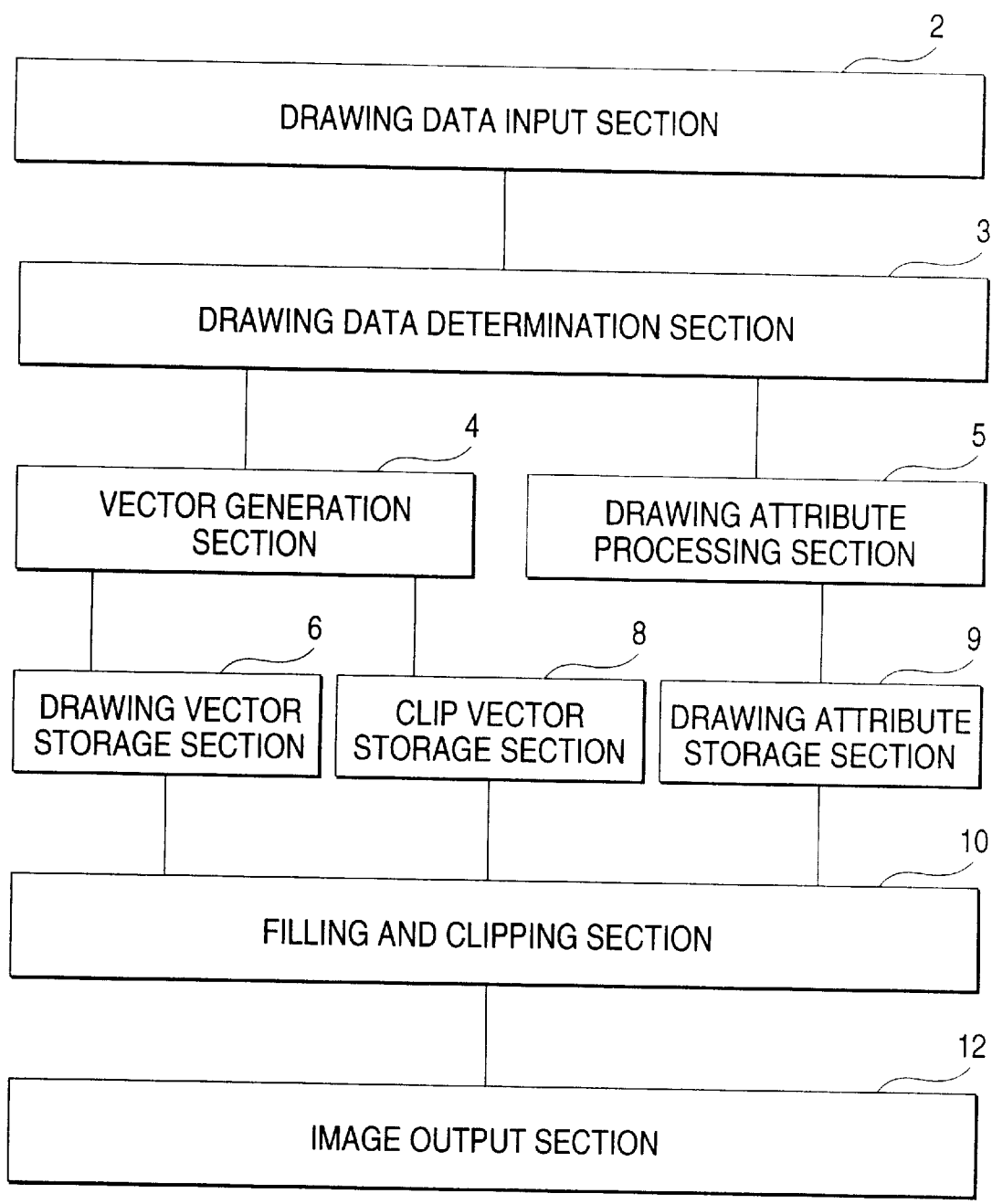
FIG. 1 is a block diagram to show the configuration of a drawing processing apparatus according to one embodiment of the invention.

First, the configuration of the drawing processing apparatus of the embodiment will be discussed with reference to a block diagram shown in FIG. 1. The drawing processing apparatus of the embodiment has a drawing data input section 2 for receipt of the drawing data to be drawn. A drawing data determination section 3 determines the drawing data type from the drawing data input to the drawing data input section 2 and passes the drawing data having an outline shape to a vector generation section 4 and a drawing attribute processing section 5 and the drawing data having no outline shape to the drawing attribute processing section 5 according to the drawing data type. The vector generation section 4 prepares or constructs vectors representing an outline shape from the drawing data received from the drawing data determination section 3. The drawing attribute processing section 5 gets different drawing attributes for each drawing data type from the drawing data passed from the drawing data determination section 3 and performs processing as required.

A drawing vector storage section 6 stores vectors concerning drawing of "fill" and "fine line" (drawing vectors) among the vectors prepared by the vector generation section 4. A clip vector storage section 8 stores vectors concerning clip (clip vectors) among the vectors prepared by the vector generation section 4. A drawing attribute storage section 9 stores drawing attribute data processed by the drawing attribute processing section 5. A filling and clipping section 10 reads the vectors stored in the drawing vector storage section 6 and the clip vector storage section 8 for each scan line and performs filling and clipping at the same time. An image output section 12 outputs the data resulting from the filling and clipping to an image output unit (not shown).

The configuration and operation of the drawing processing apparatus of the embodiment shown in FIG. 1 will be discussed in detail.

First, FIGS. 2 to 5 show the structure of drawing data received at the drawing data input section 2. The drawing data is given as a drawing command string, as shown in FIG. 2. For example, a drawing command of "clip set" consists of an ID indicating the drawing order, an identifier indicating that the drawing command type is clip setting (CLIPSET), a determination rule used to determine the inside or outside of the clip area, and a coordinate string for determining a clip shape (point 1, . . . , point n).

A drawing command of "clip clear" consists of an ID indicating the drawing order, an identifier indicating that the drawing command type is clip clear (CLIPCLEAR), and an ID of the clip to be cleared. Like the "clip set" command, a drawing command of "fill" consists of an ID indicating the drawing order, an identifier indicating that the drawing command type is filling (FILL), a determination rule used to determine the inside or outside of the fill area, and a coordinate string for determining an outward shape (point 1, . . . , point n). In addition, the command includes color information. A command of "fine line," which does not require any inside or outside determination rule, is made up of an ID, an identifier, a color, and a coordinate string.

The drawing command types include "clip set," "clip clear," "fill," "fine line," etc., as shown in FIG. 3. "Character," "raster," and the like are excluded from the embodiment because "character" can be represented by "fill" and "raster" can be handled as an outline shape which can be represented by a graphic form and color is special.

Figure 5A:
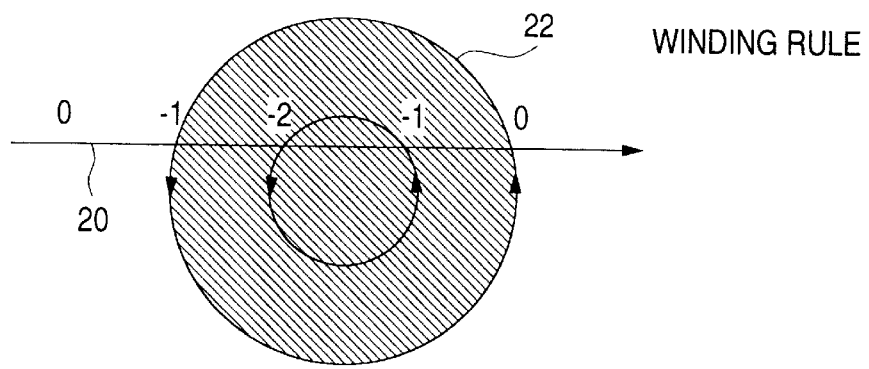
FIGS. 5A and 5B are illustration to explain the inside determination rules.
Figure 5B:
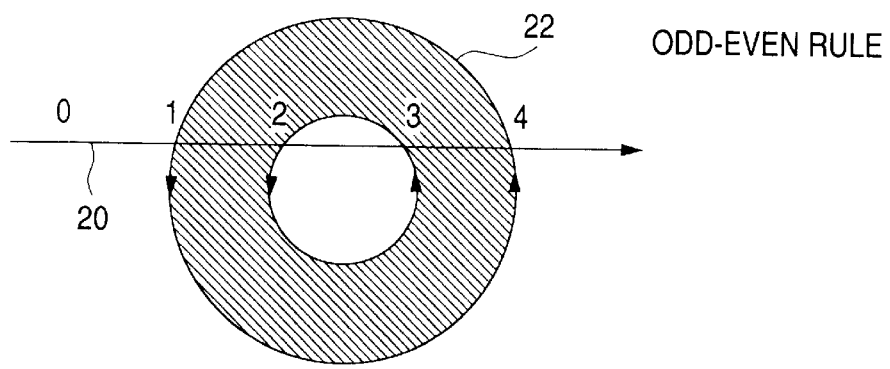

FIG. 4 shows the determination rules used to determine the inside or outside determination of a clip area and a fill area. The two types of determination rules are available: Winding rule (NZ) and odd-even rule (EO). They are rules used to determine the inside of one graphic form formed of a plurality of outline shapes (buses). Graphic form inside determination methods according to the winding rule and the odd-even rule will be discussed with FIG. 5. The winding rule shown in FIG. 5A considers the direction when the outline shape forming a graphic form 22 crosses a scan line 20. In FIG. 5A, a case where the outline shape crosses the scan line 20 upward is assumed to be positive and a case where the outline shape crosses the scan line 20 downward is assumed to be negative. If the outline shape crosses positively toward the scan direction, one is added; if the outline shape crosses negatively toward the scan direction, one is subtracted. The area between the point where the total value does not become zero and the point where the total value is restored to zero is determined the inside. In the odd-even rule shown in FIG. 5B, the number of path crossing a scan line 20 is counted and the area between an odd point and an even point is determined the inside.

Next, processing of the vector generation section 4 in FIG. 1 will be discussed with FIGS. 6 and 7. As described above, the vector generation section 4 prepares a vector representing an outline shape from input drawing data. Drawing data contains curve components, but here, is all handled as line data resulting from linear approximation.

Figure 6:
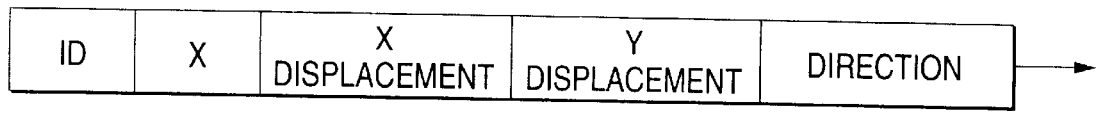
FIG. 6 is an illustration of a vector prepared by a vector generation section 4.

A vector prepared by the vector generation section 4 takes data representation as shown in FIG. 6. In the vector in FIG. 6, "ID" is ID of drawing command. "X" denotes the value of an X intercept of the vector crossing the current scan line. "X displacement" denotes the change amount of the X intercept when processing moves to the next scan line. "Y displacement" denotes the remaining number of scan lines affected by the vector. "Direction" indicates the direction of the vector.

The vector in FIG. 6 will be discussed more specifically with FIG. 7. In FIG. 7, the coordinate system has the upper-left corner of the drawing as the origin and therefore the X coordinate increases in the horizontal right direction of the drawing and the Y coordinate increases in the vertical downward direction. The vector shown in FIG. 7A has the coordinates of start point P1, at (100, 100), and the coordinates of end point P2, at (200, 200). It has α, for example, as the "ID," 100 as the "X" indicating the X intercept value on the current scan line, 1 as the "X displacement" indicating the change amount of the X intercept when processing moves to the next scan line, and 100 as the "Y displacement" indicating the remaining number of scan lines. As the "direction" of the vector, the direction in which the Y direction of the coordinate system increases is defined as 1 and the direction in which the Y direction of the coordinate system decreases is defined as −1. Therefore, the "direction" of the vector in FIG. 7A is 1. This "direction" is used as information indicating which direction the scan line is crossed in when an inside or outside determination is made according to the winding rule. FIG. 7B shows the vector with −1 as the "direction."

In the embodiment, the points or the point string which put the points in a raw in the drawing command shown in FIG. 2 assumes that the first point and the last point are concatenated for "fill" and "clip set." Therefore, three sides of a triangle are described if the point string contains three points. "Fine line" is made up of two points and a line connecting the two points is drawn.

In such a vector representation, the vector generation section 4 prepares a vector representing an outline shape from the drawing data input to the drawing data input section 2.

Of the vectors prepared by the vector generation section 4, vectors concerning drawing of "fill" and "fine line" (drawing vectors) are stored in the drawing vector storage section 6 and vectors concerning clip (clip vectors) are stored in the clip vector storage section 8.

Next, processing of the drawing attribute processing section 5 and the drawing attribute storage section 9 in FIG. 1 will be discussed with reference to FIGS. 8 to 11. The drawing attribute processing section 5 gets attributes required for each drawing command type, as shown in FIG. 8. For example, the identifier (CLIPSET) and determination rule are gotten from the drawing command "clip set." The identifier (FILL), determination rule, and color are gotten from the drawing command "fill" like "clip set." The identifier (STROKE) and color are gotten from the drawing command "fine line." No attributes are gotten from the drawing command "clip clear."

The gotten attribute values are entered in a drawing attribute table having records shown in FIG. 9 with the IDs as keys. FIG. 10 shows stored data for each drawing command type. FIG. 10A shows a clip set record with CLIPSET as the type and determination rule as attribute 1. FIG. 10B shows a fill record with FILL as the type and determination rule as attribute 1 and color as attribute 2. FIG. 10C shows a fine line record with STROKE as the type and color as attribute 1. Information other than the gotten attribute values is also added to the records to link the IDs and various pieces of information with each other, as described later in detail.

If the drawing command type is "clip set" or "clip clear," clip retrieval tables are prepared. The two types of clip retrieval tables are prepared: One is a table for determining whether or not clipping is to be executed in one clip set (clip state table) and the other is a table for checking one clip for a scope (clip scope table).

The clip state table is searched with the ID of one drawing command as a key and as a result, whether or not clipping is to be executed can be determined. The clip scope table is searched with the ID of one clip as a key and as a result, the rewrite range of the clip state table can be provided.

The clip retrieval tables will be discussed specifically with reference to FIG. 11. As shown in FIG. 11A, assume that there is a drawing command string of ID (indicating the drawing order)=a and drawing type=clip A set, ID=b and drawing type=clip B set, ID=c and drawing type=clip A clear, ID=d and drawing type=clip C set, ID=e and drawing type=clip C clear, and ID=f and drawing type=clip B clear (where a<b<c<d<e<f).

A clip state table of a binary tree of IDs and clip state as shown in FIG. 11B and a clip scope table as shown in FIG. 11C are prepared from the drawing command string. The clip state table in the embodiment is built as a binary tree, but may be prepared by any other method.

In FIG. 11B, route [0, E) indicates an ID zone of IDs equal to or greater than 0 and less than E (end of IDs). The notation "[" representing the zone means "equal to or greater than" and ")" means "less than." This also applies to other ID zones of nodes in FIG. 11B. The zone data, the number of set clips, and a counter value are stored in the lowest node as data. In the figure, for example, the lowest node [a, b) represents zone data and the number of set clips, 1, is stored in the left below [a, b) and the counter value 0 is stored in the right below [a, b). The counter value of the end node of the clip state table is increased when a new clip area becomes inside when fill drawing processing is performed; the counter value is decreased when a new clip area becomes outside. When the number of clips becomes equal to the counter value, all clips in the zone are in the inside state.

Therefore, it is known that the "fill" drawing command with ID a' (where a<a'<b) is affected only by as many clips (in this case, clip A) as the number of clips stored in the node [a, b) (in this case, 1) by searching the table in the order of route [0, E) and nodes [0, d), [0, b), and [a, b). For example, it is known that the "fill" drawing command with ID d' (where d<d'<e) is affected by as many clips (in this case, clips B and C) as the number of clips stored in the node [d, e] (in this case, 2) (the command is not affected by the clip A cleared) by searching the table in the order of route [0, E] and nodes [d, E], [d, f], and [d, e].

Therefore, to execute "clip set," data (zone data, number of clips, and counter value) is added to the lowest node (end node) of the clip state table. However, to execute "clip set" consecutively, no node needs to be added and the zone data ID is changed, then the number of clips is incremented.

To execute "clip clear," the node in the preceding zone is terminated and a node indicating a new zone is added. The number of clips in the added node is provided by decrementing the number of clips in the preceding zone by one. To execute "clip clear" consecutively, no node needs to be added and the number of clips is decremented.

The vectors stored in the drawing vector storage section 6 and the clip vector storage section 8 are read into the filling and clipping section 10 in the scan line order and filling and clipping are executed at the same time. In the filling and clipping, the data stored in the drawing attribute storage section 9 is read as required. The data resulting from the filling and clipping is output from the image output section 12 to the image output unit (not shown). The filling and clipping section 10, which plays a central role in the drawing processing apparatus of the invention, will be discussed later in detail.

Figure 12:
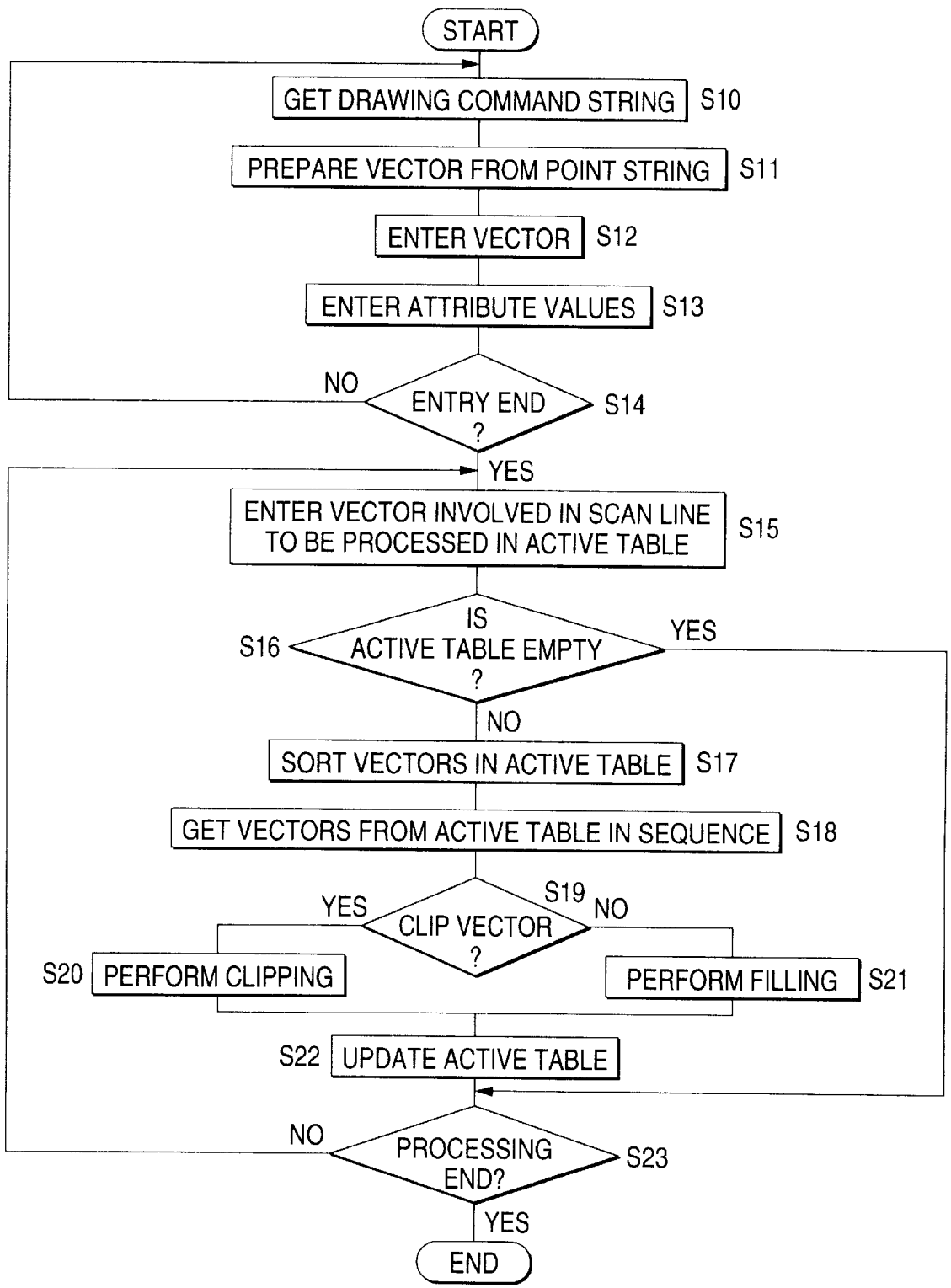
FIG. 12 is a flowchart to explain a general flow of filling and clipping performed by the drawing processing apparatus in the embodiment of the invention.

Next, the filling and clipping performed by the drawing processing apparatus in the embodiment will be outlined with reference to a flowchart shown in FIG. 12.

The process flow shown in FIG. 12 is roughly divided into two loops. The first loop is made up of steps S10 to S14 and the second loop is made up of steps S15 to S23.

In the first loop, first the drawing data input section 2 gets a drawing command string at step S10. Next, one drawing command in the gotten drawing command string is fetched and a vector is prepared by the vector generation section 4 from all the point string to the drawing command at step S11. All prepared vectors are entered in either the drawing vector storage section 6 or the clip vector storage section 8 in response to the drawing command type at step S12. Next, drawing attributes are gotten from the drawing command and are entered in the drawing attribute storage section 9 in response to the drawing command type at step S13. Steps S10 to S13 are repeated until the entry end at step S14 for all drawing commands in the drawing command string. The first loop will be discussed in more detail with a flowchart shown in FIG. 15.

Next, in the second loop, first a vector involved in scan line to be processed is fetched from among the vectors stored in the vector storage sections 6 and 8 and is entered in an active table at step S15. Next, whether or not the active table is empty is checked at step S16. If the active table is empty, control goes to step S23. If the active table is not empty, the vectors entered in the current active table are sorted in the scan line scanning direction at step S17. Next, the vectors are read from the active table in sequence at step S18 and the vector type is determined at step S19. If the vector type is determined a clip vector, clipping is performed while inside determination is being made at step S20. If the vector type is determined a drawing vector, filling is performed while inside determination is being made at step S21. After processing of one scan line terminates, the active table is updated at step S22. Steps S15 to S22 are repeated until the processing end at step S23 for all scan lines. The second loop will be discussed later in more detail with FIG. 22.

We have outlined the filling and clipping performed by the drawing processing apparatus according to the embodiment. Subsequently, processing of the drawing processing apparatus of the embodiment will be discussed furthermore clearly and sufficiently based on a specific example shown in FIG. 13.

Figure 13:
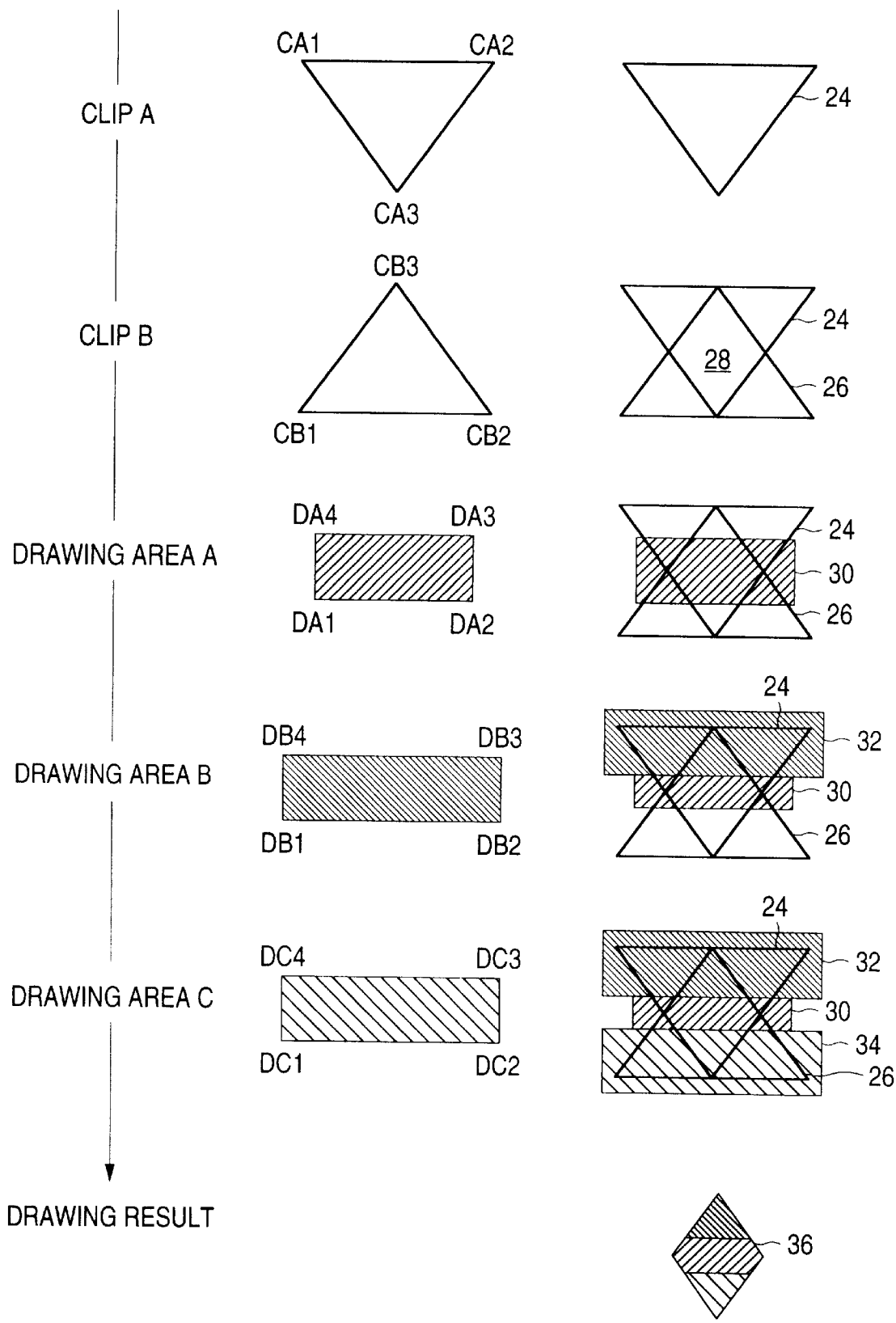
FIG. 13 is an illustration to show a specific example of the filling and clipping performed by the drawing processing apparatus in the embodiment of the invention.

FIG. 13 shows an example wherein two clips are specified as drawing commands and three rectangular areas affected by the clips are drawn. First, a triangular area 24 made up of three points CA1, CA2, and CA3 as shown in the figure is defined by drawing command "clip A." Next, a triangular area 26 made up of three points CB1, CB2, and CB3 is defined by drawing command "clip B." In the example, the points CA1, CA2, and CB3 have the same Y coordinate and the points CA3, CB1, and CB2 also have the same Y coordinate. The points CA1 and CB1 have the same X coordinate, the points CA3 and CB3 have the same X coordinate, and the points CA2 and CB2 have the same X coordinate. Therefore, two triangular areas 24 and 26 form a rhombic area 28, which becomes a clip area.

Next, rectangular areas 30, 32, and 34 are filled in order at different positions in different colors by drawing commands "drawing area A," "drawing area B," and "drawing area C."

As the drawing result of clipping, a rhombic area 36 filled in specified colors in the rectangular areas 30, 32, and 34 is provided inside.

Figure 14:
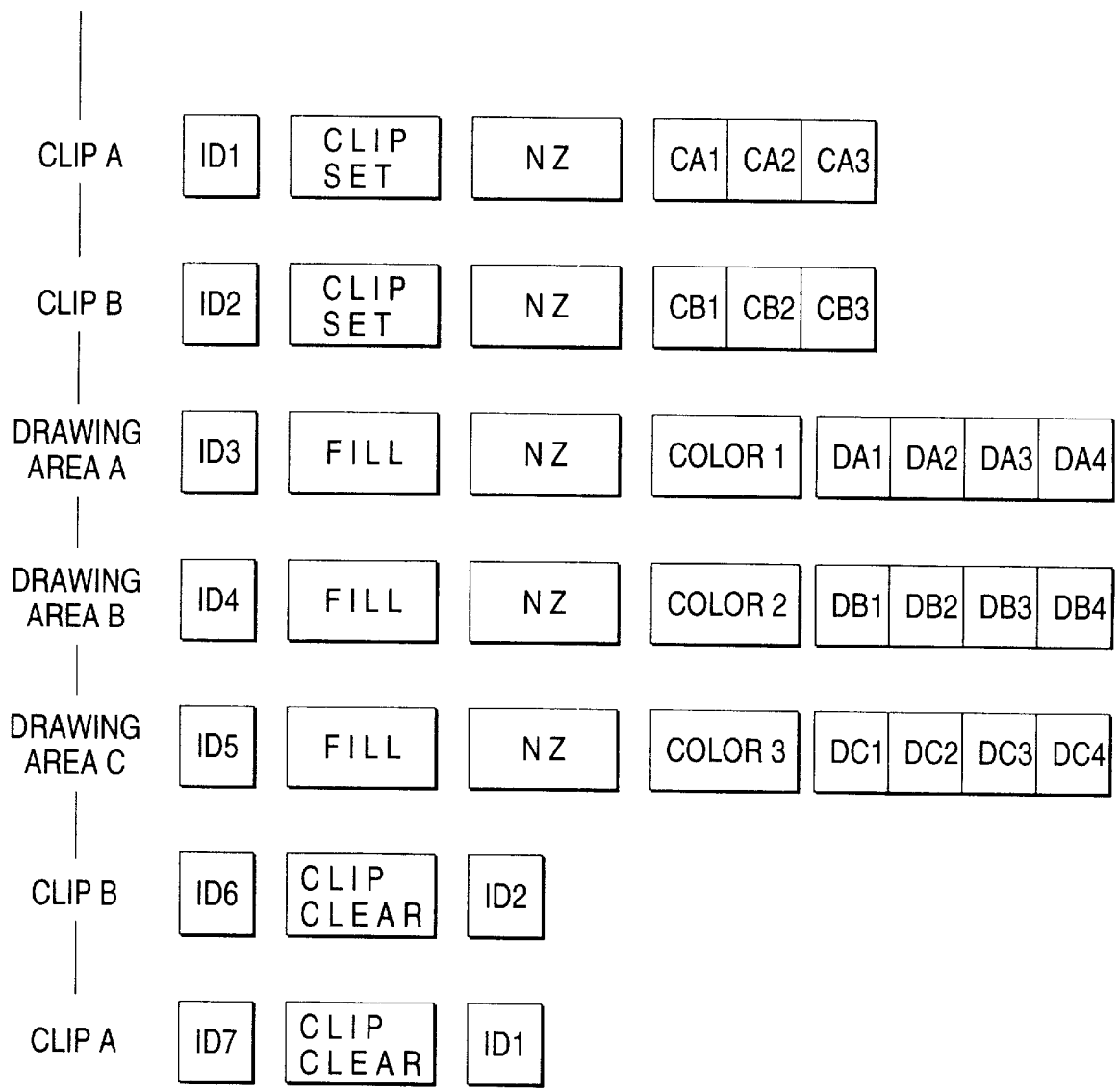
FIG. 14 is an illustration to show a drawing command string in the drawing processing in FIG. 13.

FIG. 14 shows the drawing command string in the drawing processing in FIG. 13. The drawing command string shown in FIG. 14 consists of seven drawing commands. The drawing command "clip A" consists of ID=ID1 representing the drawing order, identifier CLIPSET indicating that the drawing command type is "clip set," determination rule=NZ for inside determination, and position information of clip shape determination points, CA1, CA2, and CA3. Likewise, the drawing command "clip B" consists of ID=ID2, identifier CLIPSET, determination rule=NZ, and point position information CB1, CB2, and CB3. The drawing command "drawing area A" consists of ID=ID3, identifier FILL indicating that the drawing command type is "fill," determination rule=NZ, point position information DA1, DA2, DA3, and DA4, and fill color information "color 1." Likewise, the drawing command "drawing area B" consists of ID=ID4, identifier FILL, determination rule=NZ, color information "color 2," and point position information DB1, DB2, DB3, and DB4. The drawing command "drawing area C" consists of ID=ID5, identifier FILL, determination rule=NZ, color information "color 3," and point position information DC1, DC2, DC3, and DC4.

The processing sequence of the drawing processing apparatus in the embodiment will be discussed in detail using the drawing command string shown in FIG. 14.

Figure 15:
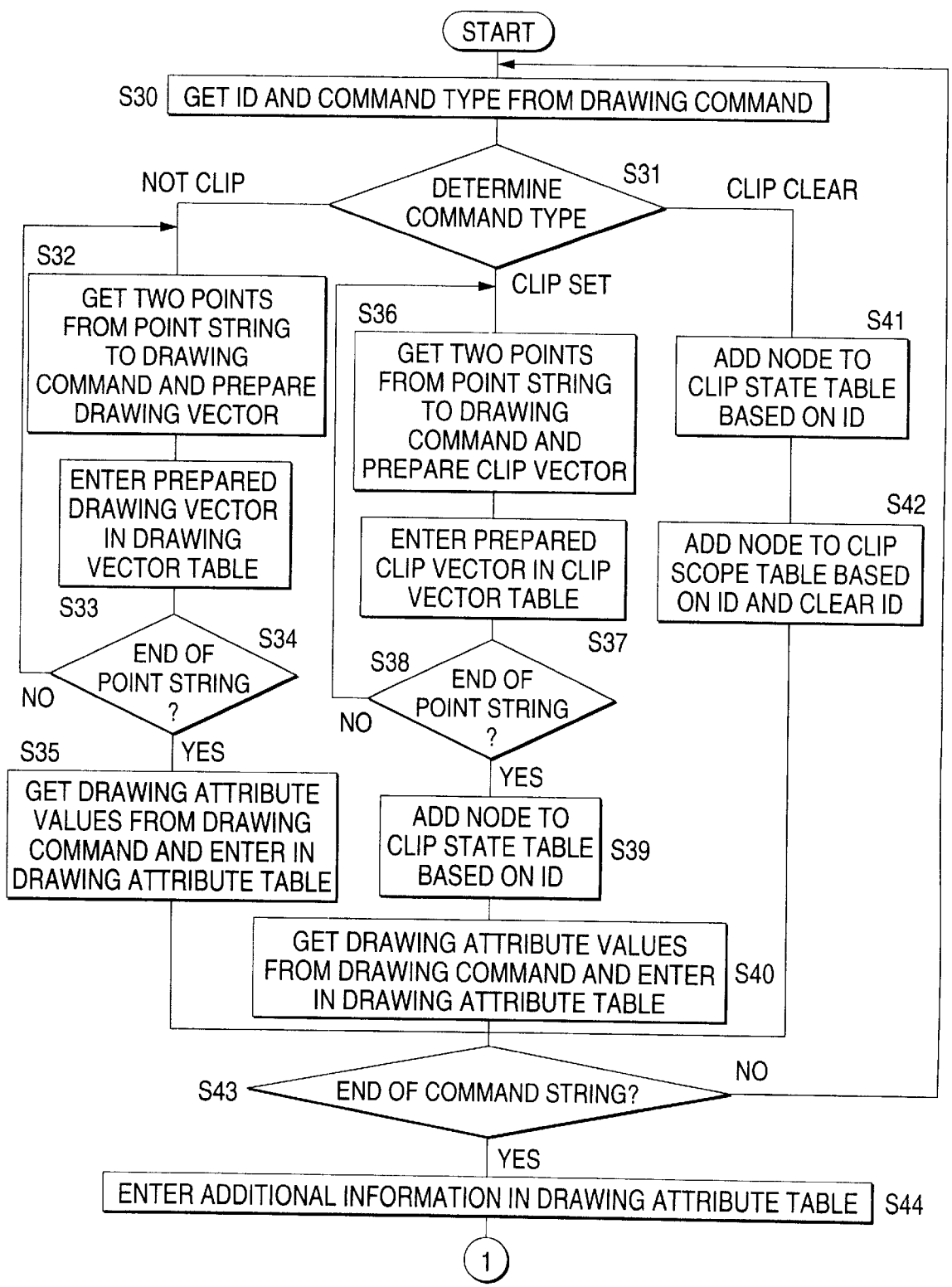
FIG. 15 is a flowchart to explain the first loop in FIG. 12 in detail.

First, the first loop outlined with reference to FIG. 12 will be discussed in detail with FIG. 15.

The ID and drawing command string are fetched from one drawing command in the drawing command string input to the image data input section 2 at step S30. Next, the drawing command type is determined at step S31. If it is not clip, control branches to step S32; if clip set, control branches to step S36; if clip clear, control branches to step S40.

If the drawing command type is not clip, two points are fetched from all the point string to the drawing command and a drawing vector is prepared at step S32. The drawing vector prepared at step S32 is a vector represented in the format as shown in FIG. 6. That is, the direction of the coordinate system shown in FIG. 7 is considered and the vector "direction" is calculated. Assuming that the Y axis of the coordinate system is positive in the vertical downward direction of the drawing, if the vector has the start point of the two fetched points having a larger coordinate than the end point, the vector direction is inverted to −1. For example, if two points (200, 200)–(100, 100) are given, the X intercept becomes 100 and the direction becomes −1 (see FIG. 7B).

Figure 16:
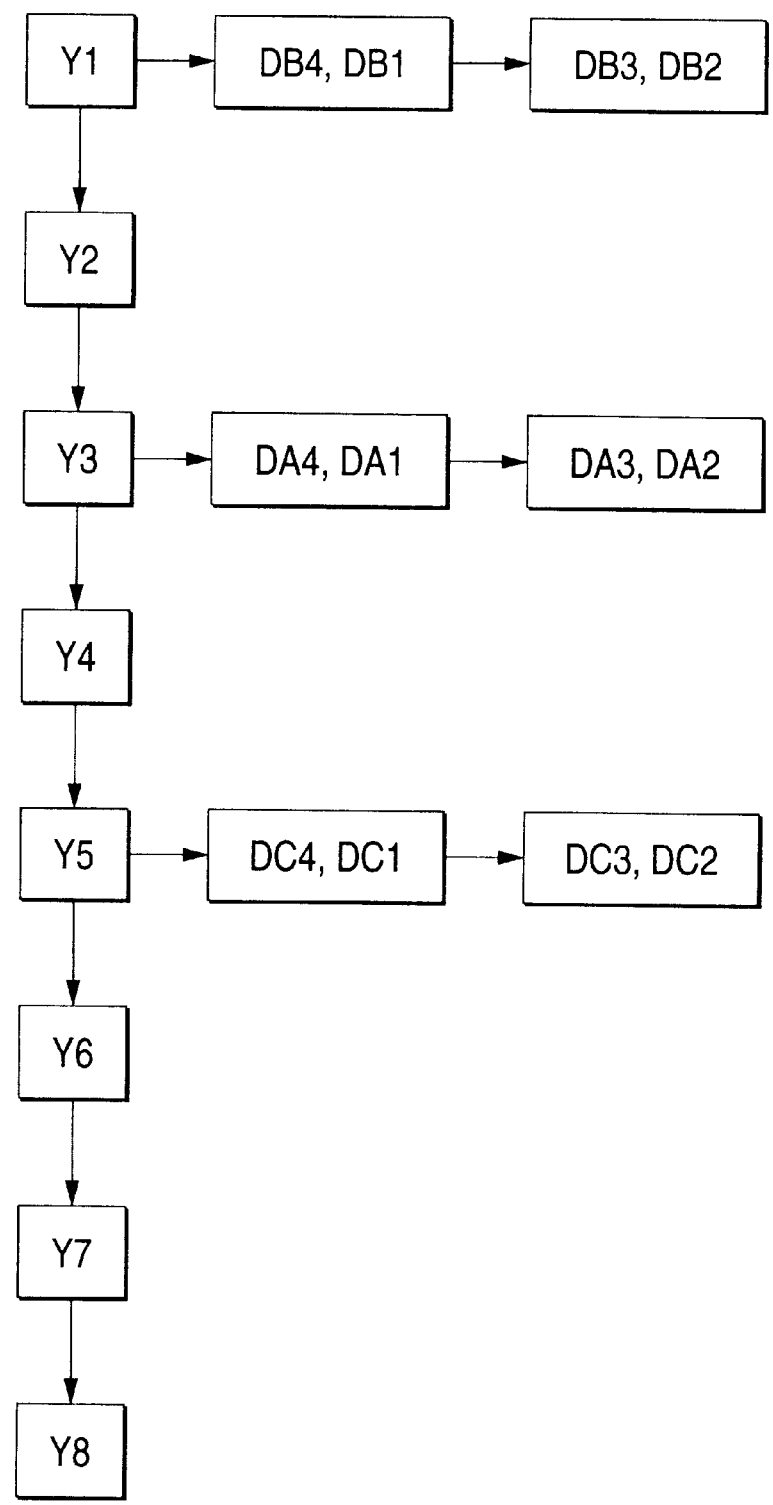
FIG. 16 is an illustration to show the state of a drawing vector table after point string processing is complete.

The drawing vector thus prepared is entered in a drawing vector table at step S33. Steps S32 and S33 are repeated until processing of all the point string to the drawing command (other than clip) is complete at step S34. FIG. 16 shows the state of the drawing vector table after the point string processing is complete. Vectors parallel with the X coordinates are not related to processing and may be not necessarily entered (in the example, not entered).

Next, the drawing attributes values to the drawing command are fetched and entered in the drawing attribute table at step S35. The drawing attributes entered at step S35 are a record represented in the format as shown in FIG. 9. That is, if the drawing command is fill, the drawing attributes become the record in FIG. 10B and if the drawing command is fine line, the drawing attributes become the record in FIG. 10C.

Figure 17:
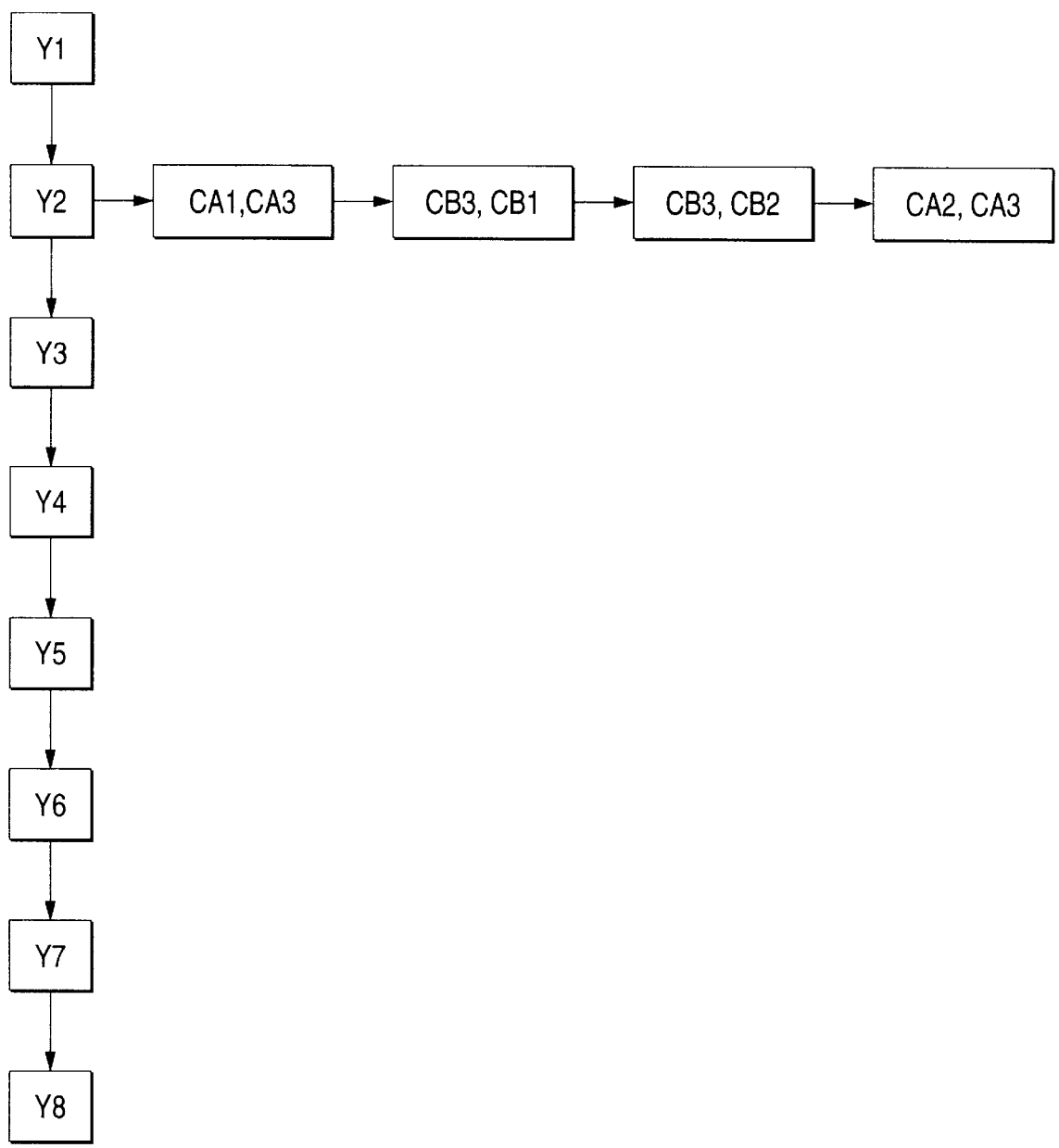
FIG. 17 is an illustration to show the state of a clip vector table after point string processing is complete.

Next, if the drawing command type is determined clip set at step S31, control goes to step S36 at which two points are fetched from all the point string to the drawing command and a clip vector represented in the format shown in FIG. 6 is prepared at step S36. The prepared clip vector is entered in a clip vector table at step S37. Steps S36 and S37 are repeated until processing of all the point string to the drawing command of clip set is complete at step S38. Then, a node is added to the clip state table based on the ID of clip set at step S39. Next, the drawing attribute values to the drawing command are fetched and entered in the drawing attribute table at step S40. FIG. 17 shows the state of the clip vector table after the point string processing is complete.

Figure 18:
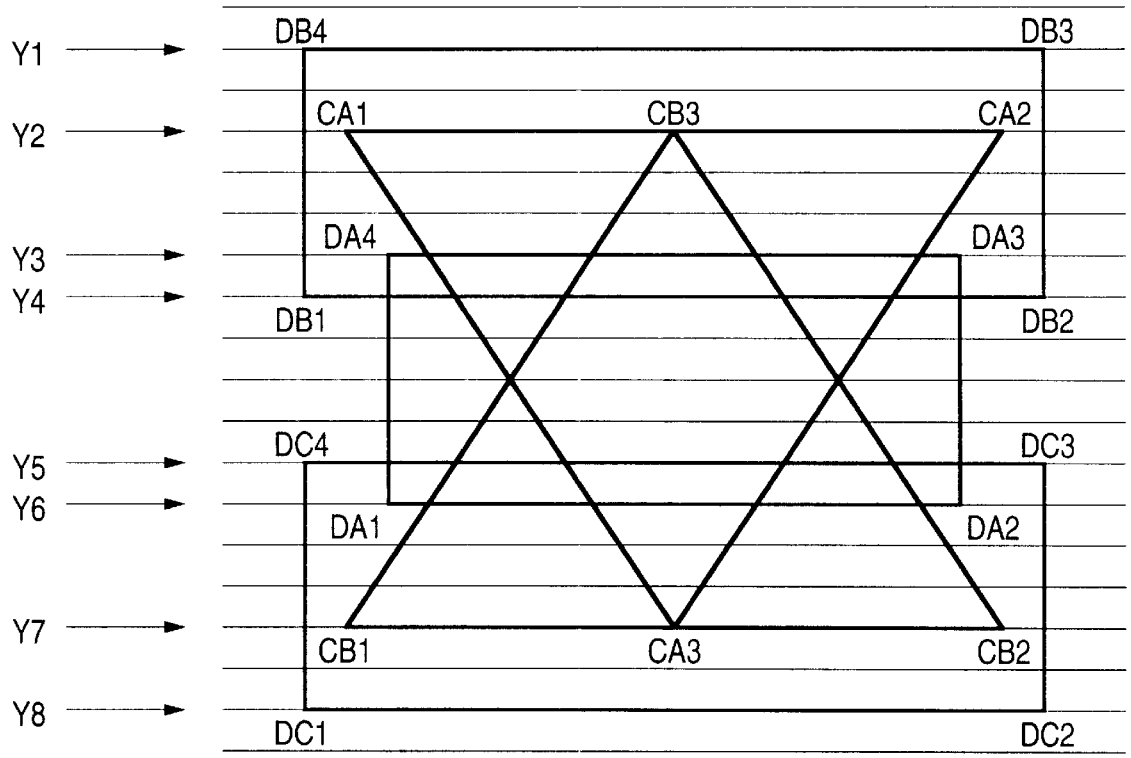
FIG. 18 is an illustration to show the relationship between scan lines and vectors corresponding to the example shown in FIG. 13.

The drawing vector table and the clip vector table shown in FIGS. 16 and 17 will be discussed in more detail with FIG. 18, which shows the relationship between the scan lines and vectors based on the examples in FIGS. 13 and 14. In FIG. 18, a plurality of scan lines are arranged in the vertical direction and the scan lines related to the start and end points of each vector are assigned numbers Y1–Y8 from the top to the bottom. For example, the two drawing vectors making up the drawing area B, (DB4, DB1) and (DB3, DB2), are linked with the scan line Y1. Since each vector is always linked with the Y coordinate of the start point of the vector in downward corrected relation considering the vector "direction," the drawing vector (DB3, DB2) having the start point DB2 and the end point DB3 is linked with the scan line Y1. Likewise, the drawing vectors of the drawing areas A and C are linked with the scan lines Y3 and Y5 respectively.

On the other hand, the clip vector is also linked with the scan line Y2 considering the vector "direction."

The drawing vector table in FIG. 16 is also provided with information of scan lines having intersection points with vectors like scan lines Y2, Y4, and Y6–Y8; the clip vector table in FIG. 17 is also provided with information of scan lines having intersection points with vectors like scan lines Y1 and Y3–Y8. However, the information is not necessarily required. In contrast, data of all scan lines may be stored in the table as an array.

Figure 19:
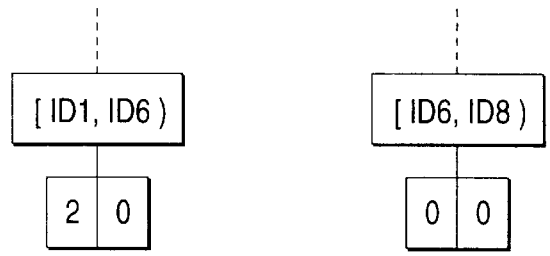
FIG. 19 is an illustration to show the clip state table corresponding to the example shown in FIG. 13.
Figure 20:
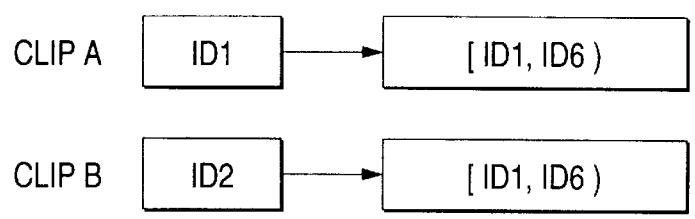
FIG. 20 is an illustration to show the clip scope table corresponding to the example shown in FIG. 13.

Next, if the command type is determined clip clear at step S31, control goes to step S41 at which the node of the preceding zone in the clip state table is terminated based on the ID of the clip clear command and a new zone node is added at step S41. Based on the ID of the clip clear command and the ID of the clip to be cleared to the clip clear command, the node of the ID of the clip to be cleared is added to the clip scope table and is linked with the related end node in the clip state table at step S42. FIGS. 19 and 20 show the clip state table and the clip scope table, respectively, after processing of all drawing commands, namely, at the termination stage of the first loop.

As shown in FIG. 19, the zone between ID1 and ID5 is affected by two clips and the inside state of each clip in the zone can be checked according to the counter value. As shown in FIG. 20, both clips A and B affect the zone between ID1 and ID5 in the clip state table. Thus, the clip state table can be used to easily check the drawing command clip state and the clip scope table can be used to easily check which zone is affected when the inside state of one clip changes.

The processing is repeated until processing of all the drawing commands in the drawing command string is complete at step S43.

Figure 21:
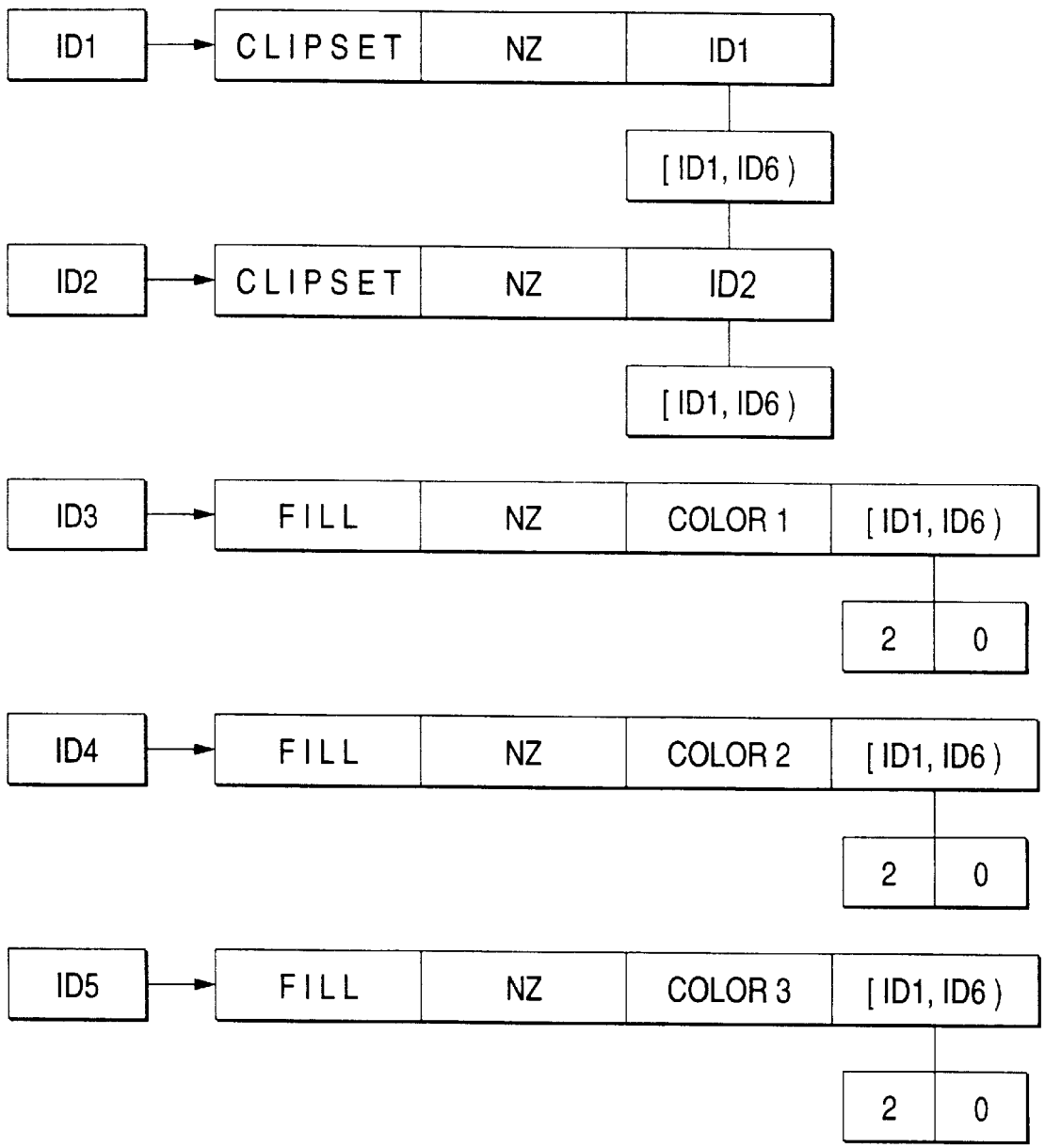
FIG. 21 is an illustration to show the drawing attribute table corresponding to the example shown in FIG. 13.

At the end of the first loop, additional information is added to the drawing attribute table at step S44. FIG. 21 shows drawing attribute records after processing of all the drawing commands is complete. As shown here, link to the clip state table for fill and thin line and link to the clip scope table for clip set are added to the records for each command type shown in FIG. 10 as miscellaneous information.

In FIG. 21, the record corresponding to clip set of clip A of ID1 contains the type (CLIPSET), the determination rule (NZ), and link of clip A to the clip scope table as additional information. Likewise, the record corresponding to clip set of clip B of ID2 contains the type (CLIPSET), the determination rule (NZ), and link of clip B to the clip scope table as additional information. The record corresponding to the drawing area A of ID3 contains the type (FILL), the determination rule (NZ), color (color 1), and link to the clip state table (ID1 to ID5) as additional information. Likewise, the record corresponding to the drawing area B of ID4 contains the type (FILL), the determination rule (NZ), color (color 2), and link to the clip state table (ID1 to ID5) as additional information. Likewise, the record corresponding to the drawing area C of ID5 contains the type (FILL), the determination rule (NZ), color (color 3), and link to the clip state table (ID1 to ID5) as additional information.

Thus, if a plurality of drawing vectors and a plurality of clip vectors exist, their correspondence can be provided easily.

The drawing command processing is now complete, whereby the first loop described with reference to FIG. 12 is complete.

Figure 22:
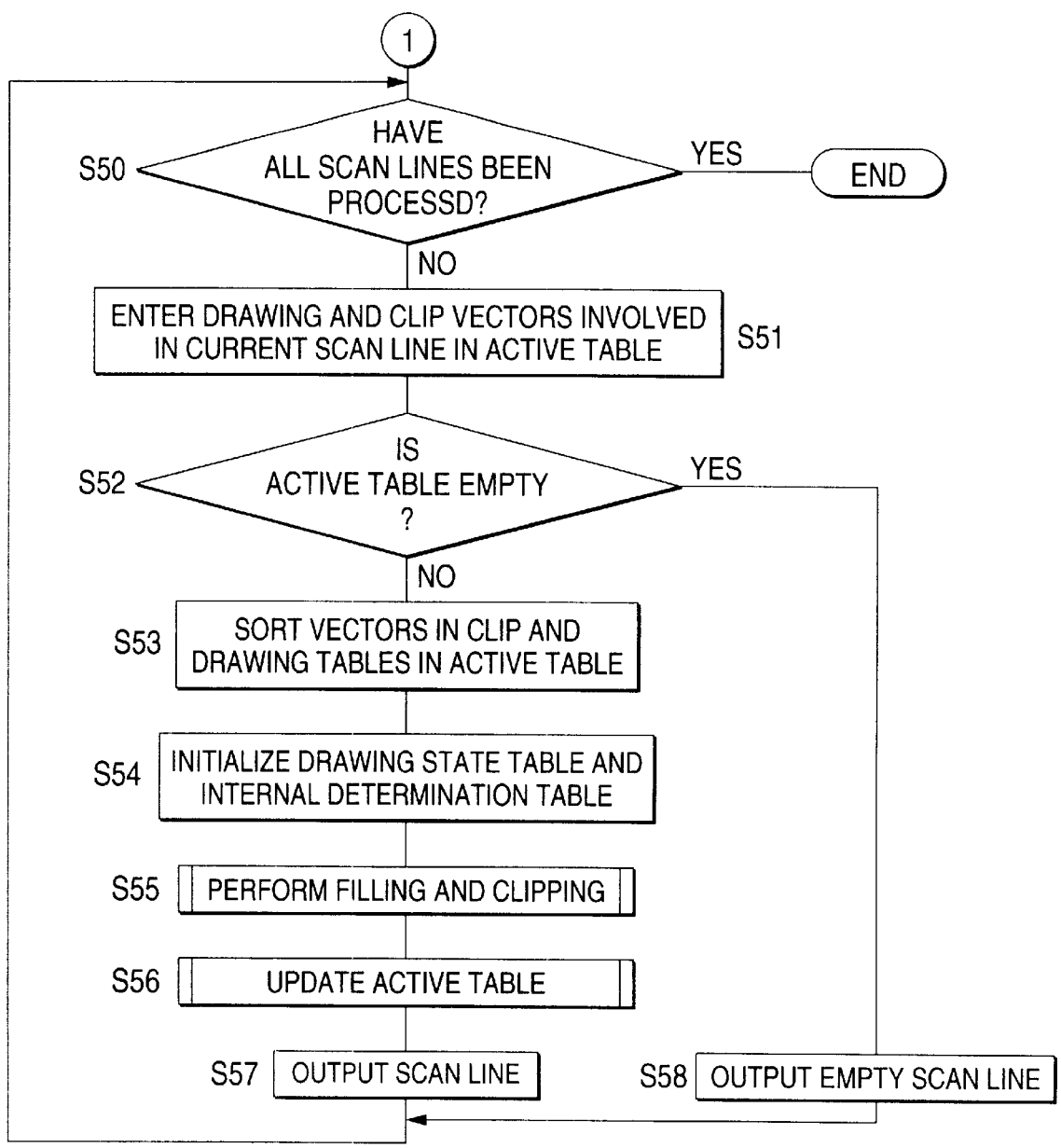
FIG. 22 is a flowchart to explain the second loop in FIG. 12 in detail.
Figure 25:
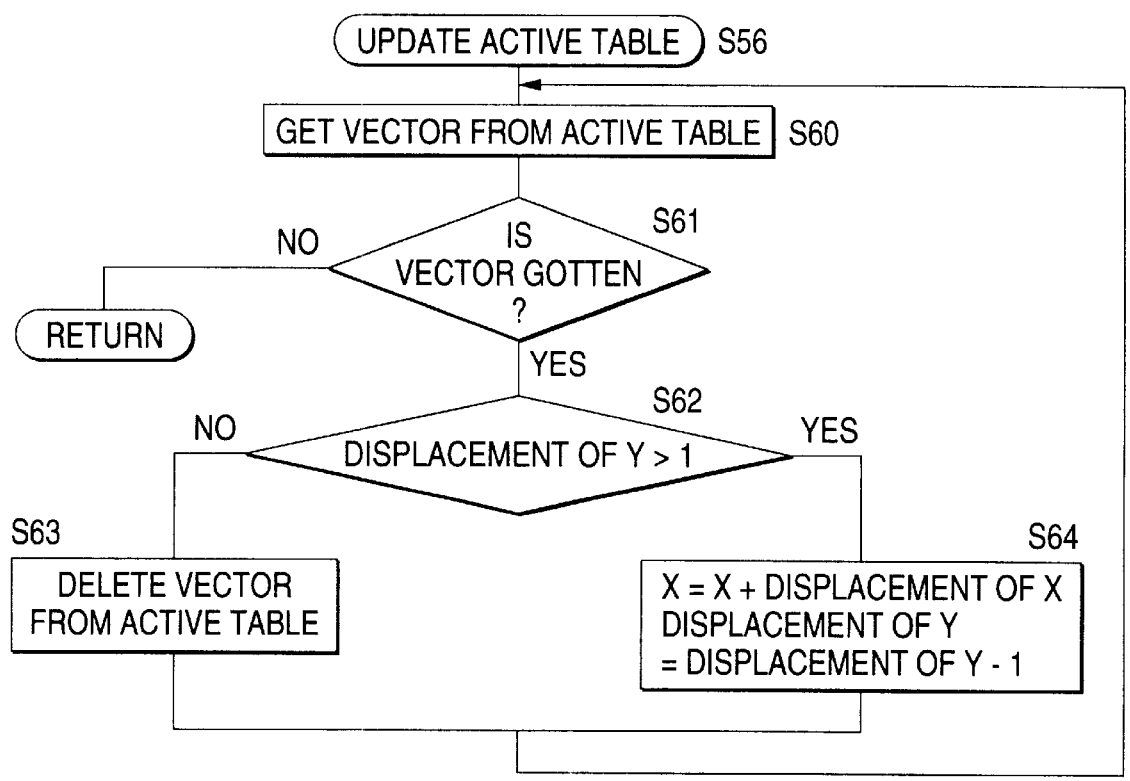
FIG. 25 is a flowchart to explain the active table update process shown in FIG. 22 in more detail.

Next, the second loop in FIG. 12 will be discussed in detail with reference to a flowchart in FIG. 22. In the flowchart, first whether or not all scan lines have been processed is determined at step S50. If all scan lines have been processed, the second loop is complete and the clipping and filling performed by the drawing processing apparatus in the embodiment are complete.

If the scan line to be processed still remains, the vectors involved in the current scan line are gotten from the drawing vector table shown in FIG. 16 and the clip vector table shown in FIG. 17 and are stored in the active table. The clip vector is entered in a clip table in the active table and the drawing vector is entered in a drawing table in the active table.

Next, whether or not the active table is empty is determined at step S52. If vectors exist on the scan lines Y1–Y8 and do not exist on any other scan line as in FIGS. 16 and 17, the active table corresponding to the scan lines other than Y1–Y8 becomes empty. If the active table is empty, no data exists on the scan lines, thus an empty scan line is prepared at step S58 and control returns to step S50 of the first step of the second loop.

Next, if a vector exists in the active table, all vectors on the scan line are sorted regardless of whether or not a new vector is added to the current scan line being processed at step S53. If vectors are crossed between scan lines, the vector state on the scan line becomes different from the vector state on the preceding scan line, thus all vectors on the scan line are again sorted in a predetermined order.

In this case, all vectors existing in both the drawing and clip tables in the current active table are sorted in the ascending order of X coordinates in the scan line scanning direction. In the embodiment, all vectors in the active table are always sorted for each scan line. However, for example, whether or not vectors are to be sorted may be determined based on vector cross information.

As a sort example, FIG. 23 shows the state just after vectors are entered in the active table corresponding to Y3 of the scan lines shown in FIG. 18 and the vectors are sorted. The drawing table indicates that the drawing area A exists in the drawing area B. The clip table indicates that the clip B exists in the clip A.

Next, common information to the vectors in the scan line is initialized at step S54. The common information in the scan line is information in an inside determination table shown in FIG. 24 and information in a drawing state table.

The drawing state table is provided to hold information indicating which graphic form is in the inside state at present as a result of making inside determination of drawn graphic forms. This topic will be discussed later in detail.

After the termination of initialization of the common information to the vector at step S54, filling and clipping are performed in the scan line scanning direction at step S55. A general flow of the filling and clipping will be discussed in detail with reference to FIG. 26.

Upon completion of processing of one scan. line, the active table is updated for the next scan line at step S56. The active table updating flow will be discussed with reference to FIG. 25. First, a drawing vector and a clip vector are gotten from the active table at step S60. Whether or not a vector is gotten is determined at step S61. If no vector is gotten, the process is terminated and control returns. If a vector is gotten, whether or not the Y displacement of the gotten vector is greater than 1 is determined at step S62. If the Y displacement of the vector is greater than 1, there is a possibility that the next scan line will be affected by the vector. Thus, the X displacement value is added to the X value of the vector and the result is set as the update value of the X value, and 1 is subtracted from the Y displacement and the result is set as the update value of the Y displacement at step S64. If the update value of the Y displacement is 0, the vector does not affect the next scan line, thus is deleted from the active table at step S63.

The steps are executed for all drawing and clip vectors on the scan line.

Upon completion of updating the active table, then the scan line is output at step S57. The processing of the second loop is now complete. It is performed for all scan lines.

Figure 26:
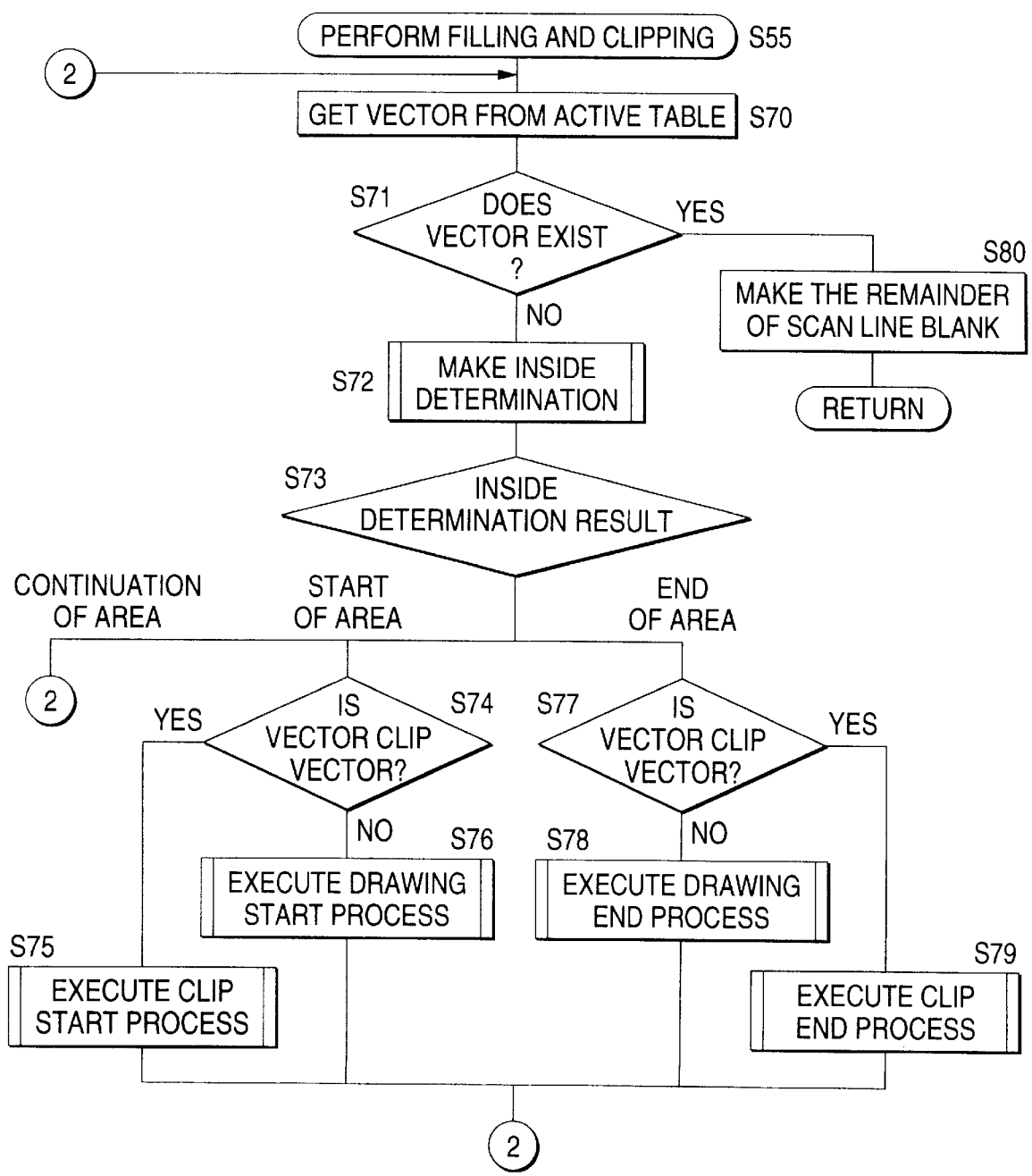
FIG. 26 is a flowchart to explain the filling and clipping shown in FIG. 22 in more detail.

Next, a more detailed flow of the filling and clipping will be discussed with reference to FIG. 26. First, vectors are gotten from the active table in sequence at step S70. Here, when the vectors are gotten, if the clip and drawing vectors have the same X coordinate, the clip vector is first gotten.

If the vectors to be gotten from the active table run out, the remaining area of the scan line is made blank and the process is terminated at step S80.

Figure 27:
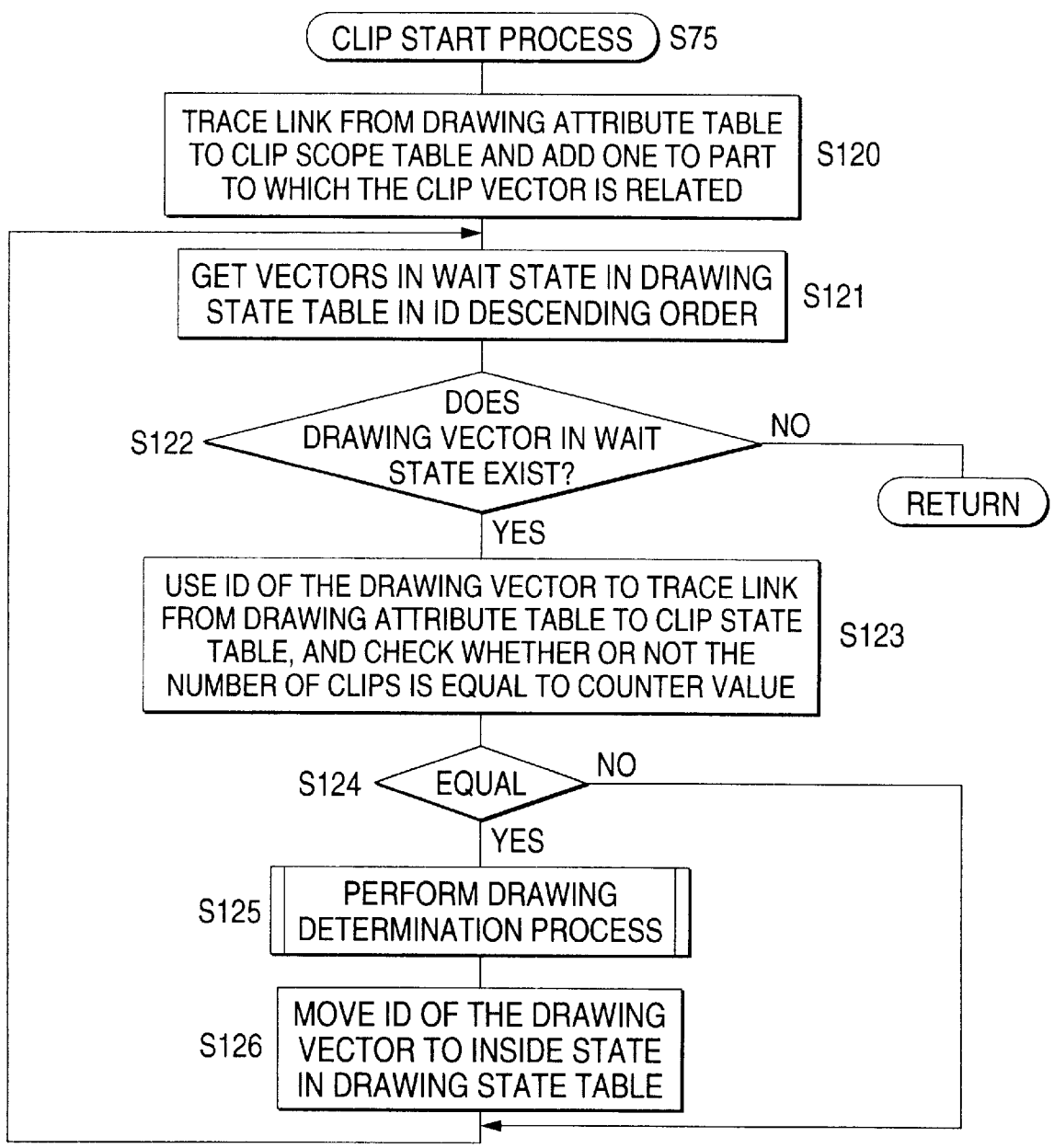
FIG. 27 is a flowchart to explain the clip start process shown in FIG. 26 in more detail.
Figure 28:
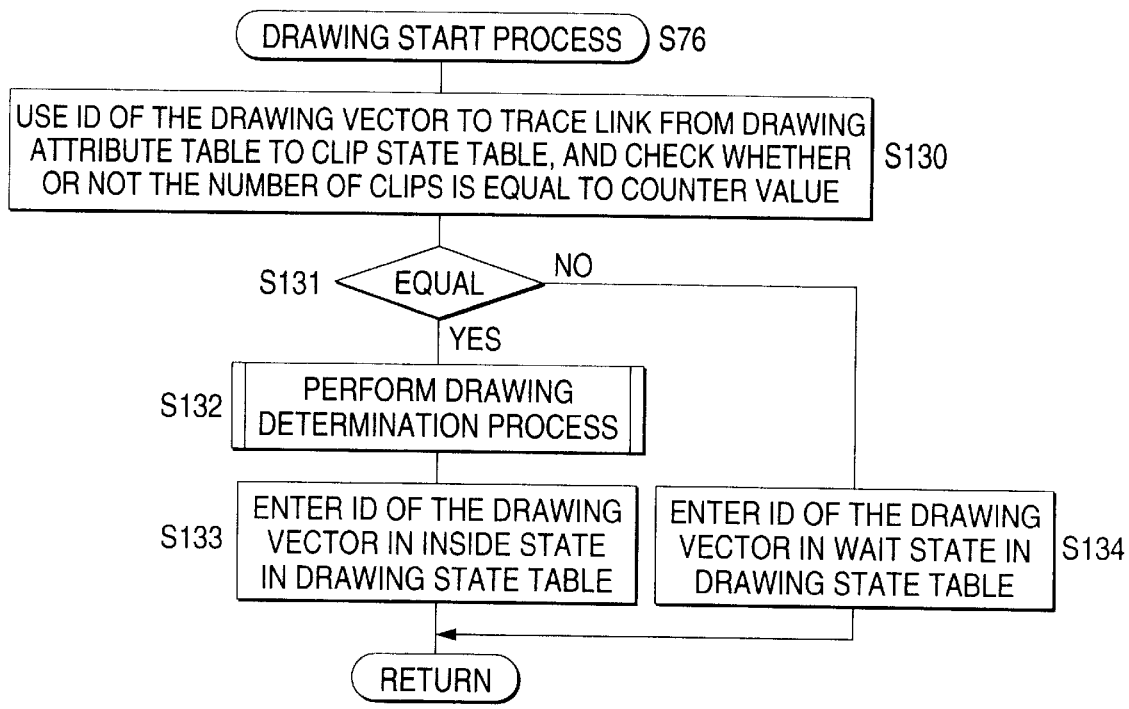
FIG. 28 is a flowchart to explain the drawing start process shown in FIG. 26 in more detail.
Figure 29:
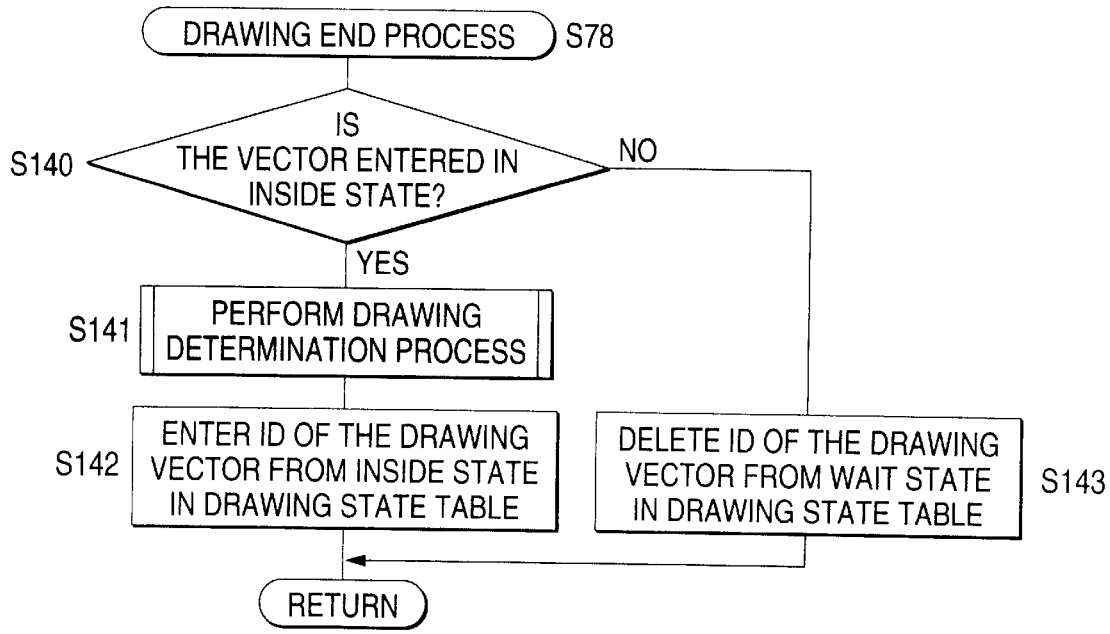
FIG. 29 is a flowchart to explain the drawing end process shown in FIG. 26 in more detail.
Figure 30:
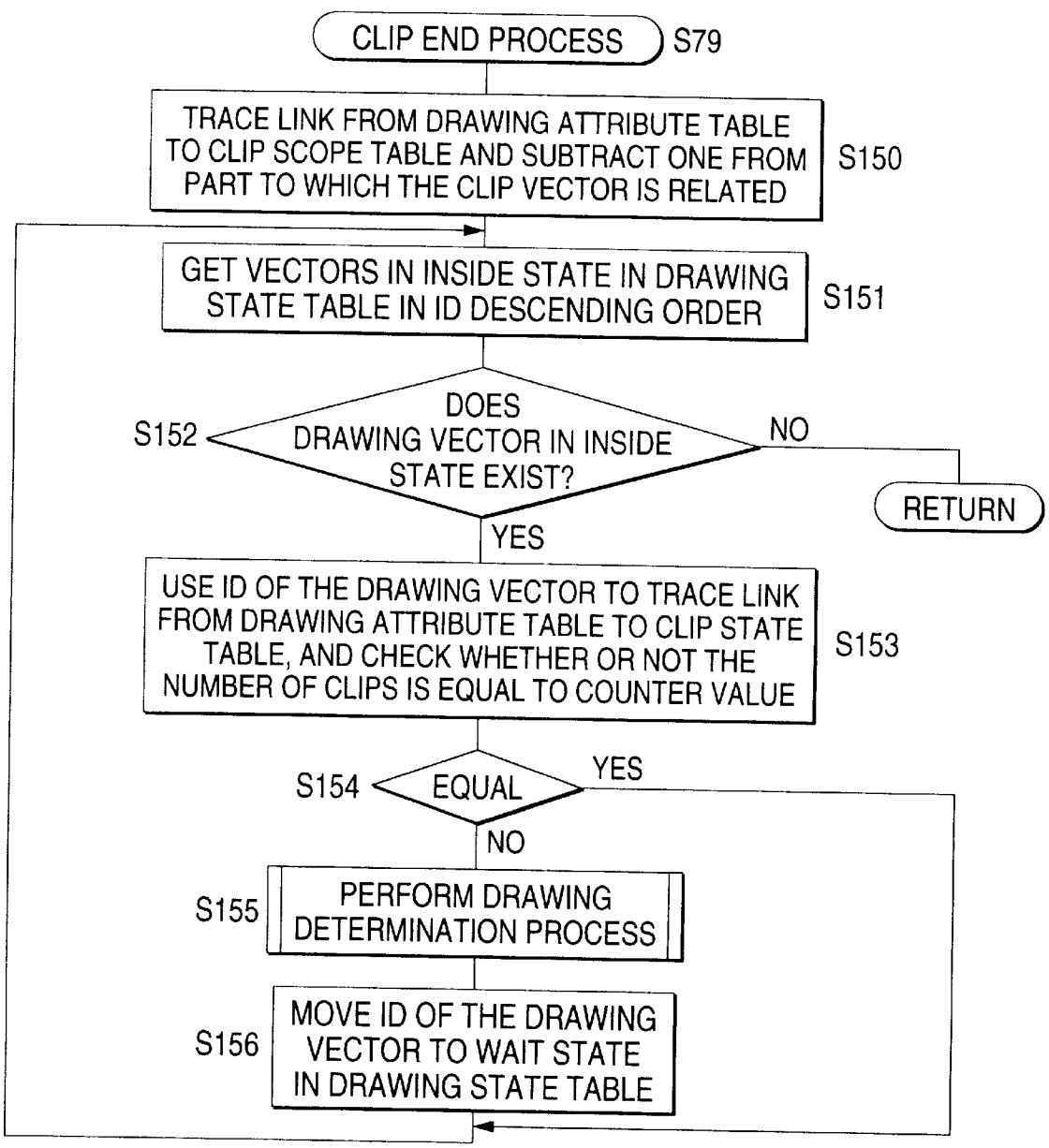
FIG. 30 is a flowchart to explain the clip end process shown in FIG. 26 in more detail.

If a clip vector or a drawing vector exists, an inside determination of the vector is made at step S72. The inside determination will be discussed later in detail with reference to FIG. 31. Next, control branches to any of the three cases based on the result of the inside determination at step S73. First, if the inside determination result is "continuation of area," the state remains unchanged, thus control returns to step S70. If the inside determination result is "start of area," control goes to step S74 at which the table in FIG. 21 is referenced for determining whether the vector is a drawing or clip vector using the ID of the vector. If the vector is a clip vector, a clip start process shown in FIG. 27 is executed at step S75. If the vector is a drawing vector, a drawing start process shown in FIG. 28 is executed at step S76. If the inside determination result is "end of area," control goes to step S77 at which likewise, whether the vector is a drawing or clip vector is determined. If the vector is a clip vector, a clip end process shown in FIG. 30 is executed at step S79. If the vector is a drawing vector, a drawing end process shown in FIG. 29 is executed at step S78. The processes shown in FIGS. 27 to 30 will be discussed later in detail.

Upon completion of the processing, control returns to step S70 to get the next vector in the scan line from the active table. The filling and clipping are thus performed.

Figure 31:
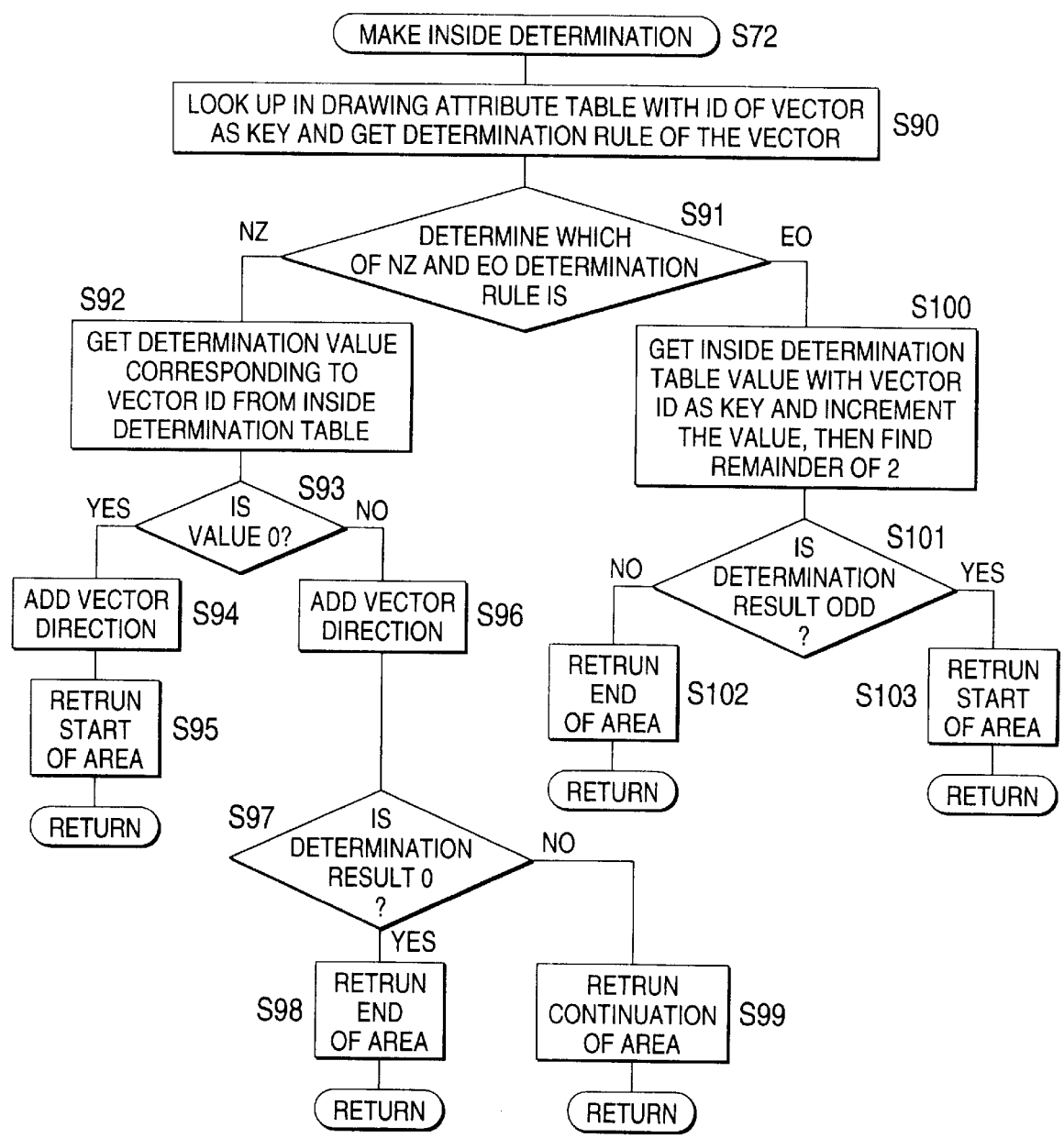
FIG. 31 is a flowchart to explain the inside determination process shown in FIG. 26 in more detail.

Next, the inside determination of the vector at step S72 will be discussed in detail with reference to FIG. 31. First, the inside determination rule of the graphic form formed of the vector is gotten from the table in FIG. 21 with the ID of the vector as a key at step S90. If the determination rule is NZ (winding rule) at step S91, control goes to step S92. If the determination rule is EO (odd-even rule) at step S91, control goes to step S100.

If the determination rule is NZ, the corresponding determination value to the ID of the vector is gotten from the inside determination table in FIG. 24 at step S92 and whether or not the value is 0 is determined at step S93. If the value is 0, the graphic form formed of the vector always becomes the inside. Therefore, the vector direction is added to the value stored in the entry of the ID of the vector in the inside determination table in FIG. 24 at step S94, then "start of area" is returned as the inside determination result at step S95. If the gotten value is not 0, the vector direction is added to the value stored in the entry of the ID of the vector in the inside determination table in FIG. 24 at step S96 and whether or not the addition result is 0 is determined at step S97. If the addition result is 0, "end of area" is returned as the inside determination result at step S98. If the addition result is not 0, the inside state continues, thus "continuation of area" is returned as the inside determination result at step S99.

If the determination rule is determined EO at step S91, the corresponding value in the inside determination table in FIG. 24 is gotten with the ID of the vector as a key and is incremented by one, then the remainder of 2 is found at step S100. If the value of the remainder of 2 is 1, the determination result becomes odd at step S101 and the graphic form becomes inside, thus "start of area" is returned at step S103. If the remainder of 2 is 0, the determination result becomes even, indicating the outside of the graphic form, thus "end of area" is returned at step S102. The inside determination process at step S72 in FIG. 26 is thus executed.

Next, clipping and filling performed based on the inside determination process result will be discussed in detail with reference to FIGS. 27 to 30.

First, the drawing state table and a drawing determination process used for both clipping and filling will be discussed.

Figure 32:
FIG. 32 is an illustration to explain a drawing state table.

First, the drawing state table will be discussed with reference to FIG. 32. It has a function of holding graphic forms (drawing vectors) in inside state at present and a function of holding information indicating where drawing is complete on the current scan line being executed. As shown in FIG. 32, the drawing state table consists of "inside state," "set wait state," and "drawing start position." If a graphic form (drawing vector) and all clips affecting the graphic form are in inside state, the graphic form is entered in the "inside state." If a graphic form is in inside state and some or all of clips affecting the graphic form are not inside state, the graphic form is entered in the "set wait state." The X coordinate of the current scan line being executed at which filling is started is held in the "drawing start position." Therefore, the area having an X coordinate smaller than the X coordinate stored in the "drawing start position" has already been filled.

Next, the drawing determination process will be discussed with reference to FIG. 33. It is a process for determining whether or not filling is to be performed; it is a common routine used for the filling and clipping shown in FIGS. 27 to 30. A "comparison ID" and a "comparison X coordinate" are previously passed to the drawing determination process routine. First, at step S110, whether or not a graphic form in the inside state is entered in the drawing state table in FIG. 32 is checked. If no graphic forms in the inside state exist, the area between the drawing start position and the comparison X coordinate −1 is not filled, thus the drawing start position is set to the comparison X coordinate and the process is terminated at step S114. At this time, transparence may be output to the area between the drawing start position and the comparison X coordinate.

If a graphic form is entered in the "inside state" in the drawing state table, the maximum ID in the "inside state" is compared with the comparison ID at step S111. If the maximum ID in the inside state is greater than the comparison ID, the process is terminated, because the last drawn one of the graphic forms already in the inside state is painted on the comparison graphic form. If the maximum ID in the inside state is less than or equal to the comparison ID, further the drawing start position entered in the drawing state table is compared with the comparison X coordinate −1 and if the drawing start position is greater than or equal to the comparison X coordinate −1, the process is terminated at step S112. If the drawing start position is less than the comparison X coordinate −1, the area between the drawing start position and the comparison X coordinate −1 is painted in the color corresponding to the maximum ID of the inside state vector at step S113. The drawing start position is set to the comparison X coordinate and the process is terminated at step S114.

The clip start and end processes and the drawing start and end processes will be discussed based on the drawing state table in FIG. 32 and the drawing determination process in FIG. 33.

First, the clip start process will be discussed with reference to FIG. 27. The ID of the clip vector is used as a key to get the scope to which the clip vector is related from the drawing attribute table in FIG. 21 and the counters in the clip state table in FIG. 19 in all the scope are incremented by one at step S120. Next, the IDs of the drawing vectors entered in the "set wait state" in the drawing state table are fetched in the ID descending order at step S121. If no drawing vectors are entered in the "set wait state," the clip start process is terminated at step S122.

If a drawing vector is entered in the "set wait state" at step S122, the ID of the drawing vector is used to check the link destination to the clip state table entered on the corresponding record in the drawing attribute table and whether or not the number of clips in the zone to which the ID belongs is equal to the counter value is checked at step S123. If the number of clips in the zone differs from the counter value at step S124, control returns to step S121 for fetching drawing vectors in the set wait state from the drawing state table.

Figure 33:
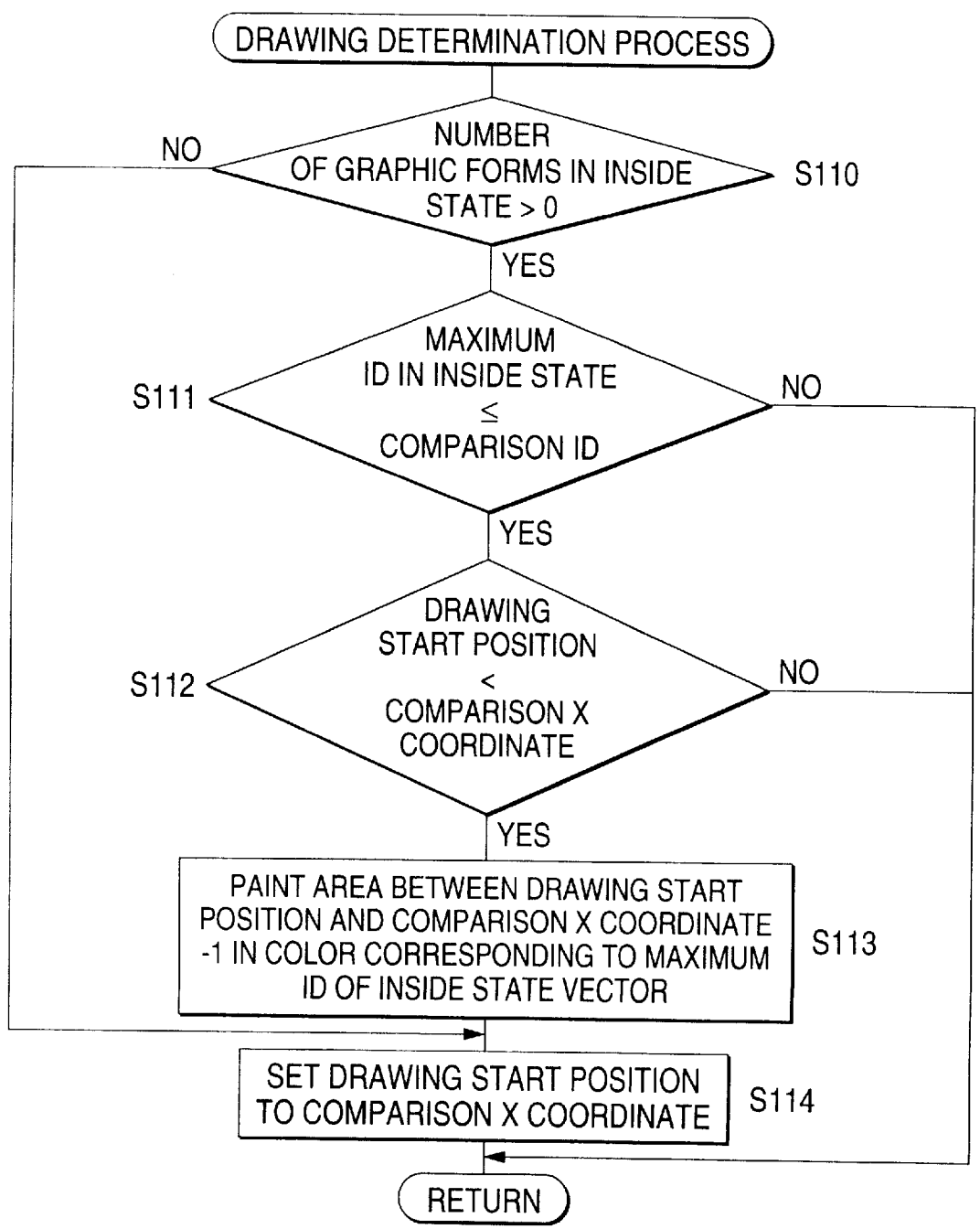
FIG. 33 is a flowchart to explain a drawing determination process in detail.

If the number of clips in the zone to which the ID of the drawing vector belongs is equal to the counter value at step S124, then the drawing determination process in FIG. 33 is executed at step S125. The comparison ID used for the drawing determination process is the ID of the drawing vector in the set wait state. The comparison X coordinate is the X coordinate of the clip vector. Further, the ID of the drawing vector is moved from the "set wait state" to the "inside state" in the drawing state table in FIG. 32 at step S126. Control returns to step S121 for fetching drawing vectors in the set wait state from the drawing state table. The clip start process is thus executed.

Next, the drawing start process will be discussed with reference to FIG. 28. The ID of the drawing vector is used as a key to check the link destination to the clip state table entered on the corresponding record in the drawing attribute table in FIG. 21 at step S130. At this time, if the number of clips in the zone to which the ID of the drawing vector belongs is equal to the counter value at step S131, drawing can be executed as a graphic form, then a drawing determination process as to whether or not filling is to be executed is performed at step S132. The comparison ID used in the drawing determination process is the ID of the drawing vector and the comparison X coordinate is the X coordinate of the drawing vector. Last, the ID of the drawing vector is newly entered in the "inside state" in the drawing state table in FIG. 32 at step S133. If the number of clips is not equal to the counter value at step S131, the ID of the drawing vector is entered in the "set wait state" in the drawing state table at step S134. The drawing start process is thus executed.

Next, the drawing end process will be discussed with reference to FIG. 29. First, the drawing state table in FIG. 32 is checked to see if the drawing vector is entered in the "inside state" at step S140. If the drawing vector is not entered in the "inside state," it is entered in the "set wait state." Then, the ID of the drawing vector is deleted from "set wait state" in the drawing state table and the process is terminated at step S143. If the drawing vector is entered in the "inside state," the drawing determination process in FIG. 33 is executed at step S141. The determination ID is the ID of the drawing vector and the determination X coordinate is the X coordinate of the drawing vector. Next, the ID of the drawing vector is deleted from the "inside state" in the drawing state table and the process is terminated at step S142. The drawing end process is thus executed.

Next, the clip end process will be discussed with reference to FIG. 30. The ID of the clip vector is used as a key to get the scope to which the clip vector is related from the drawing attribute table in FIG. 21 and the counters in the clip state table in FIG. 19 in all the scope are decremented by one at step S150.

Next, the IDs of the drawing vectors entered in the "inside state" in the drawing state table are fetched in the ID descending order at step S151. If no drawing vectors are entered in the "inside state," the clip end process is terminated at step S152. If a drawing vector is entered in the "inside state" at step S152, the ID of the drawing vector is used to check the link destination to the clip state table entered on the corresponding record in the drawing attribute table and whether or not the number of clips in the zone to which the ID belongs is equal to the counter value is checked at step S153. If the number of clips in the zone is equal to the counter value at step S154, control returns to step S151 for fetching drawing vectors in the inside state from the drawing state table. If the number of clips in the zone to which the ID of the drawing vector belongs differs from the counter value at step S154, a drawing determination process is executed at step S155.

The comparison ID used for the drawing determination process is the ID of the drawing vector in the set wait state. The comparison X coordinate is the X coordinate of the clip vector. Further, the ID of the drawing vector is moved from the "inside state" to the "set wait state" in the drawing state table at step S156. Control returns to step S151 for fetching drawing vectors in the inside state from the drawing state table. The clip end process is thus executed.

Next, as a specific example of the filling and clipping, attention is focused on the Y3 scan line shown in FIG. 18 and change in the drawing state table will be discussed with reference to FIGS. 34 and 35. First, in FIG. 34A, a drawing vector (DB4, DB1) is obtained as a gotten vector and 0 is read from the work area in FIG. 24, thus the inside determination returns drawing start. However, since no clip state is set, ID4 is entered in the "set wait state" in the drawing state table. The "drawing start position" in the drawing state table is set to 0. The clip state table is represented as shown in FIG. 19. That is, the ID zone is ID1 to ID5 and is affected by two clips. However, the counter value remains 0.

Figure 34A:
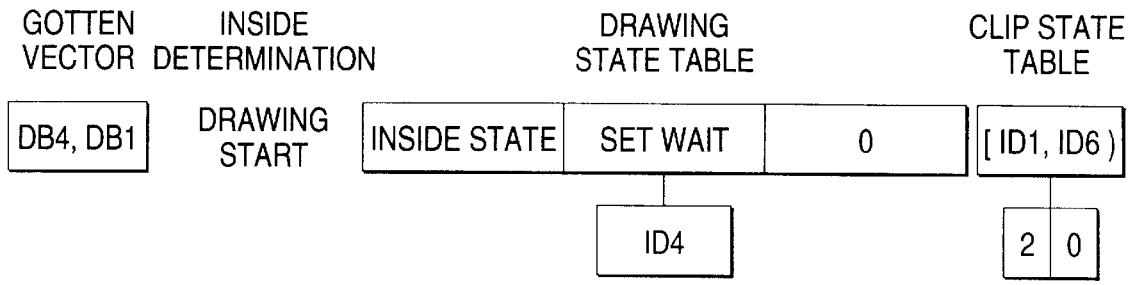
FIGS. 34A to 34D are illustration to explain change in the drawing state table on Y3 scan line.
Figure 34B:
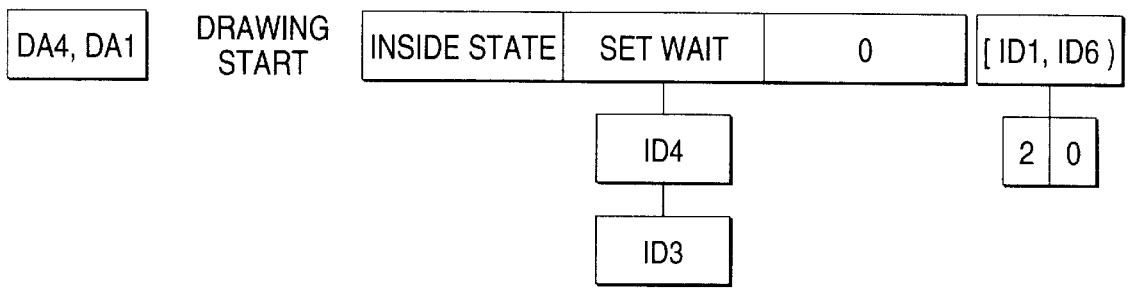

Next, in FIG. 34B, a drawing vector (DA4, DA1) is obtained as a gotten vector, but no clip state is set and the same situation as the drawing vector (DB4, DB1) is applied, thus ID3 is entered below ID4 in the "set wait state" in the drawing state table.

Figure 34C:
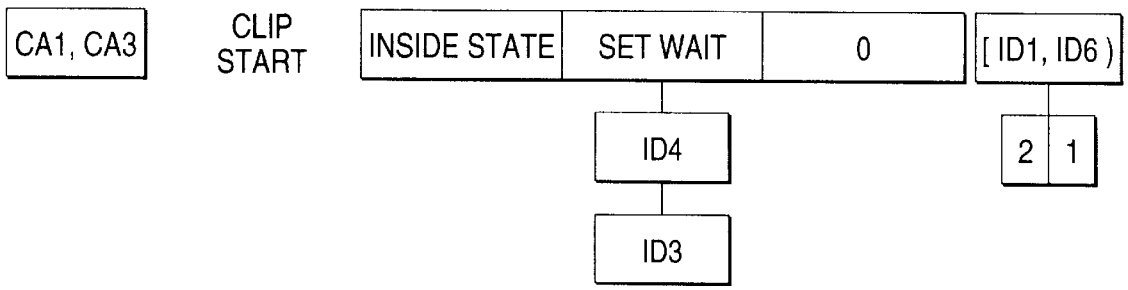

Next, in FIG. 34C, a clip vector (CA1, CA3) is obtained as a gotten vector and 0 is read from the work area, thus the inside determination returns clip start. Therefore, the counter value in the clip state table is set to 1. When ID in the set wait state is used to check the clip state, only one clip is started, thus the drawing state does not change.

Figure 34D:
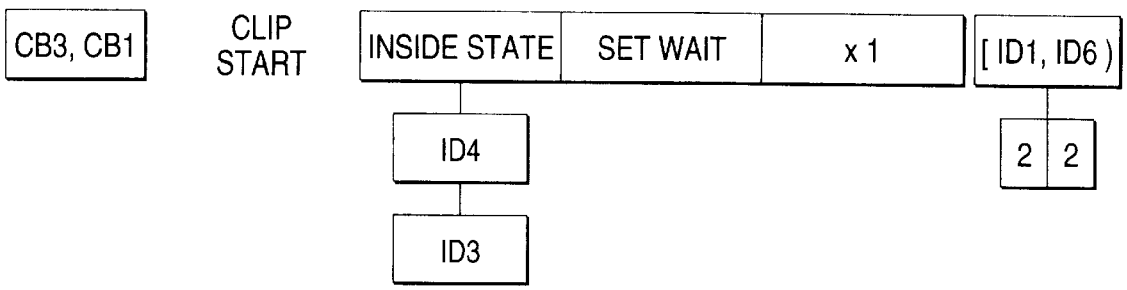

Next, in FIG. 34D, a clip vector (CB3, CB1) is obtained as a gotten vector and 0 is read from the work area, thus the inside determination returns clip start. Therefore, the counter value is set to 2. When the ID of the drawing vector in the "set wait state" is used to trace link from the corresponding record in the drawing attribute table to the clip state table, ID4 and ID3 satisfy the condition, thus are moved to the "inside state" in the drawing state table. When ID4 drawing determination process is executed, the X coordinate of (DB4, DB1) on Y3 (here, X1) is set in the "drawing start position" in the drawing state table. When ID3 drawing determination is executed, ID4 of a greater ID is already in the inside state, thus a move is only made to the inside state.

Figure 35A:
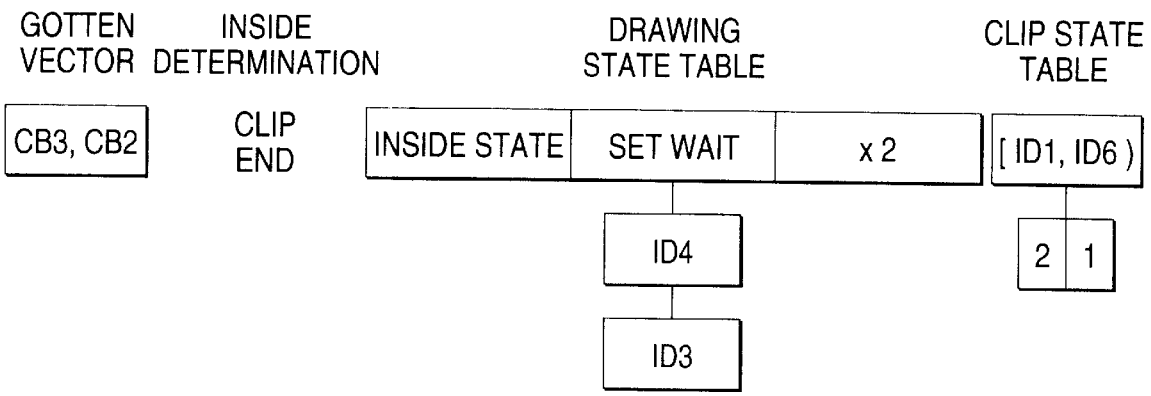
FIGS. 35A to 35D are an illustration to explain change in the drawing state table on Y3 scan line.

Next, in FIG. 35A, a clip vector (CB3, CB2) is obtained as a gotten vector and the inside determination finally becomes 0, returning clip end. Therefore, the counter value is set to 1. When the ID of the drawing vector in the "inside state" is used to trace link from the corresponding record in the drawing attribute table to the clip state table, ID4 and ID3 satisfy the condition, thus are moved to the "set wait state." When ID4 drawing determination process is executed, the area between the X coordinates X1 and X2-1 is painted in the colors corresponding to the ID4 (where X2 is the X coordinate of (cB3, CB2) on Y3). X2 is set in the "drawing start position." When ID3 drawing determination is executed, the "drawing start position" is X2, thus a move is only made to the set wait state.

Figure 35B:
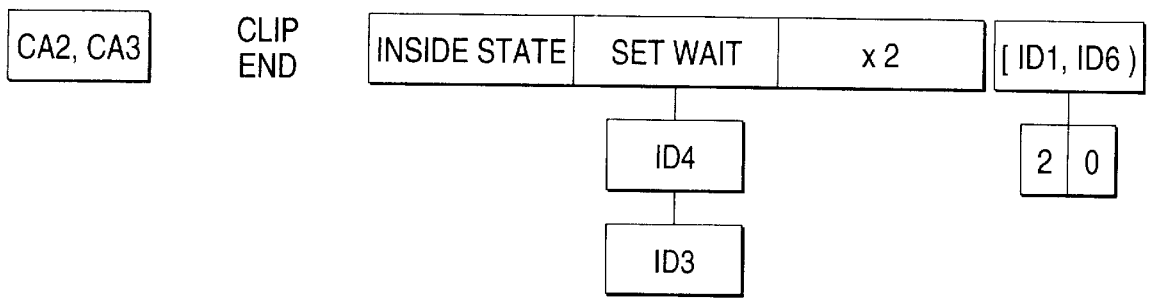

Next, in FIG. 35B, a clip vector (CA2, CA3) is obtained as a gotten vector and the inside determination finally becomes 0, returning clip end. Therefore, the counter value is set to 0. The "inside state" does not change.

Figure 35C:
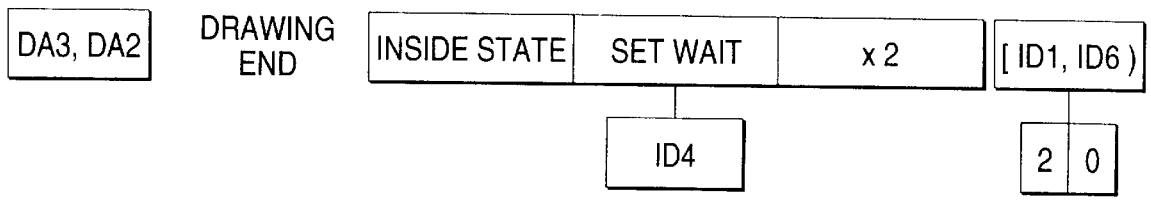

Next, in FIG. 35C, a drawing vector (DA3, DA2) is obtained as a gotten vector and the inside determination finally becomes 0, returning drawing end. The vector, which is not entered in the "inside state," is deleted from the "set wait state."

Figure 35D:
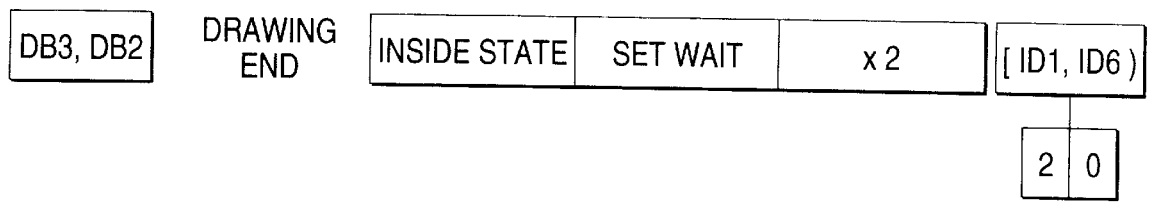

Next, in FIG. 35D, a drawing vector (DB3, DB2) is obtained as a gotten vector and the inside determination finally becomes 0, returning drawing end. The vector, which is not entered in the "inside state," is deleted from the "set wait state."

The area between the X coordinates X1 and X2-1 is thus painted using colors corresponding to the ID4.

As we have discussed, according to the drawing processing apparatus in the embodiment using the drawing state table and the drawing attribute table, clipping and filling formerly performed at different steps can be executed at the same time and merging requiring a long processing time can be omitted.

The invention is not limited to the embodiment and various modifications are possible.

For example, the drawing vector storage section and the clip vector storage section are provided in the embodiment, but can also be integrated into one vector storage section, of course.

The active table is sorted in the X coordinate ascending order in the scan line scanning direction. However, the sort method is not limited to it and another sort method can also be used based on the used coordinate system or the scanning direction of the image output unit.

After 1-page information of drawing and clip areas is stored, the processing in the embodiment is performed, whereby 1-page clipping and drawing area filling can also be performed at the same time, of course.

As we have discussed, according to the invention, clipping of a clip area consisting of a plurality of any shapes can be executed at high speed at the same time as filling.

Other examples of clip command input format and clip state retrieval table will be discussed.

The clip state is uses as a variable indicating the interclip operation result. Therefore, from the drawing object side, the table is referenced to check the state of the clip (set) affecting the drawing object. On the other hand, from one clip, the clip state affected by the clip needs to be changed.

Considering the correspondence among drawing objects, clip objects, and clip states, the features are as follows:
(1) One clip state corresponds to drawing object;
(2) one or more clip states correspond to clip objects and the number of the corresponding clip states depends on the number of interclip operation combinations; and
(3) normally, one clip object affects more than one drawing object.

Thus, the clip state retrieval table format can be changed from drawing and clip object information according to the clip command input format.

In the description made so far, the clip commands are handled in the same category as the drawing commands and the start and end of one clip object are given by clip set and clip clear commands. The interclip operation assumes a common portion to the internal areas of all clip objects existing at one moment. Such an example configuration is comparatively high in versatility, but the relation between the clip objects and the clip state is loose, thus a retrieval structure such as a binary tree is required to look up the correspondence.

However, the clip state retrieval table format can be changed from drawing and clip object information by changing the interclip operation representation format or a certain limitation.

(Method 1)

For example, assuming serial processing, a binary tree need not be used. For example, a list structure may be used to represent the relation between clip objects and the clip state may be related from the relation between the clip objects at the instant at which a drawing object is input. A description is given with reference to FIG. 36. FIG. 36A is the same as FIG. 11. FIG. 36B represents the clip state transition on the ID order axis. The lines above the axis denote the existence ranges of the clips. As seen from the comparison with FIG. 11B, the clip state list order is the same as that of the binary tree shown above. If clip set is entered, one is added to the current number-of-clips field in the clip state to generate a new clip state as the current clip state. If clip clear is entered, one is subtracted from the current number-of-clips field to generate a new clip state as the current clip state. When a drawing object is input, data to reference the current clip state is entered in the additional information field of the drawing attribute table (see FIG. 21). This processing can eliminate the need for the binary tree.

(Modification of method 1)

The clip state is made up of the two fields of the number of clips and the current number of clips in the inside state. However, only an area holding the inside or outside state of each clip object may be provided and if two or more clip objects exist, a list format may be used (see FIG. 37). In this case, if clip set is entered, a new clip state (having a field holding the inside or outside state of the clip object) is generated as the current clip state. If clip clear is entered, the corresponding clip state deleted from the current clip state. When a drawing object is input, data to reference the current clip state is entered in the additional information field of the drawing attribute table (see FIG. 21). To check the clip state corresponding to the drawing object when fill clip processing is performed, the clip state list may be traced to determine whether all clips are in the inside state.

(Method 2)

Figures 38A, 38B:
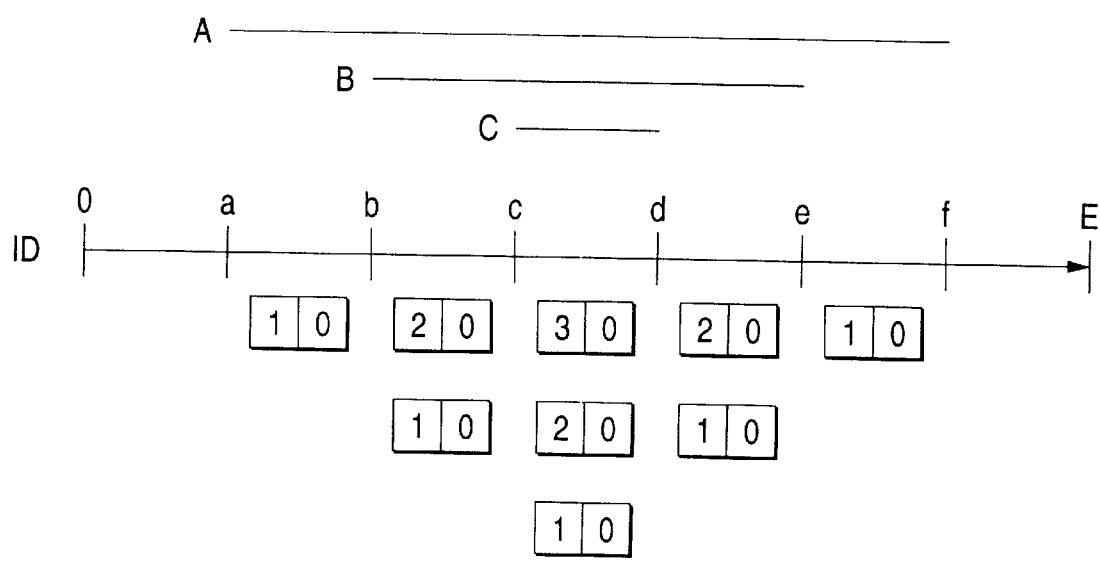
FIGS. 38A and 38B show the relation between a clip state and a drawing object.

Assuming that last-in first-out (LIFO) is determined between previously and later setup clip objects as in PostScript, a stack can be used to relate the clip state directly to a drawing object (see FIG. 38). In PostScript, a clip object is set by a command such as clip or eoclip and is cleared by grestore. That is, a previously setup clip exists and a clip added later is always first cleared, thus the current clip state may be constructed on the stack. When a drawing object is input, the current clip state on the stack top becomes the clip state affecting the input drawing object.

(Method 3)

As an alternative method, the drawing object itself is provided with information on a set of clips affecting the drawing object, whereby the correspondence can be provided more easily. For example, assume that the relation between a drawing object and a clip object is described as shown in FIG. 39. Here, the clip object ID and the drawing object ID are different series. However, the IDs represent the input order precisely.

In FIG. 39, CLIP is made up of an identifier referenced from drawing object, CID, CLIP representing the data object type, a parent clip identifier of the clip, CID, DETERMINATION RULE used to determine the inside or outside of clip frame, and PATH for specifying the graphic form shape and intra-page position. One clip object specifies a single shape and the CID of the clip is used to represent clip consisting of more than one shape. That is, the dependent relationship (parent-child relationship) between the clips is represented.

FILL is made up of a drawing object identifier ID, FILL indicating the drawing object type, an identifier of a clip affecting the drawing object, CID, an identifier or color value representing what color the inside of the drawing object is painted in, COLOR, DETERMINATION RULE used to determine the inside or outside, and PATH for specifying the graphic form shape and intra-page position.

If the description is entered, one clip is only referenced from one drawing object and only one parent just above the clip object is specified, so that a unique clip set is determined and the number of clip objects becomes the number of clip sets. Therefore, the number-of-clips field of the clip state variable can be calculated if the parent is traced from the clip object.

The data shown in FIG. 11C is a list of clip states affected by clip objects. To prepare the data, while all parent clip objects referenced by one clip object are traced, child clip object ID may be entered with parent clip object ID in a child clip object list as a key.

For example, if input data as shown in FIG. 40 exists, attribute tables as shown in FIG. 41 may be prepared. FIG. 41A is a drawing object attribute table consisting of columns of ID, TYPE, CLIP ID, COLOR, and DETERMINATION RULE. FIG. 41B is a clip object attribute table consisting of columns of CLIP ID, parent clip ID, and DETERMINATION RULE. FIG. 41C is a clip state table. FIG. 41D is a list of clip objects affected by clip objects. That is, it represents which child clip objects one parent clip object is referenced from. If FIGS. 41A and 41C are used instead of FIG. 11B and FIGS. 41B and 41D are used instead of FIG. 11C, processing can be executed in a similar manner.

What is claimed is:

1. A drawing processing apparatus comprising:

a vector generation section for generating drawing vectors representing an outline shape and clip vectors from drawing data to be drawn;

a drawing attribute processing section for getting drawing attributes from the drawing data to be drawn and preparing a correspondence table indicating which of the clip vectors each of the drawing vectors is clipped against; and a filling and clipping section for reading the prepared drawing vectors and clip vectors for each scan line and performing filling and clipping simultaneously on the correspondence table.

2. The drawing processing apparatus of claim 1, further comprising:

a vector storage section for storing the drawing vectors and the clip vectors prepared by said vector generation section.

3. The drawing processing apparatus of claim 1, further comprising:

a drawing attribute storage section for storing the correspondence table prepared by said drawing attribute processing section.

4. The drawing processing apparatus of claim 1, wherein
the correspondence table indicating which of the clip vectors each of the drawing vectors is clipped with is prepared before the filling and clipping are performed.

5. The drawing processing apparatus of claim 1, wherein
said filling and clipping section has a drawing state table for classifying the drawing vectors into an inside state and a set wait state in response to the state of the clip corresponding to the drawing vector to be clipped.

6. The drawing processing apparatus of claim 1, wherein said filling and clipping section has a drawing state table for classifying the drawing vectors into an inside state and a set wait state in response to the state of the clip corresponding to the drawing vector to be clipped.

7. A drawing processing apparatus comprising:
a vector generation section for preparing from a drawing command containing an ID representing a drawing order and points determining an outline shape, drawing vectors and clip vectors each containing the ID and a value of an X intercept on a scan line;
a drawing attribute processing section for preparing a correspondence table indicating which of the clip vectors each of the drawing vectors is clipped with;
a vector getting section for getting a vector string crossing one scan line from the drawing vectors and the clip vectors; and
a filling and clipping section for determining drawing start and end positions on the one scan line based on the correspondence table and the X intercept values of the drawing and clip vectors in the vector string and performing filling and simultaneously.

8. The drawing processing apparatus of claim 7, further comprising:
means for sorting the vector string gotten by said vector getting section according to the X intercept values.

9. The drawing processing apparatus of claim 8, wherein
said sort means sorts the vector string so that the drawing and clip vectors can be gotten in an order in which said filling and clipping section scans scan lines.

10. The drawing processing apparatus of claim 8, further comprising:
an image output section for providing an output image for an output unit, wherein
said sort means sorts the vector string in a horizontal scanning direction of said image output section.

11. The drawing processing apparatus of claim 7, further comprising:
vector string exclusion means for excluding from the vector string a vector string not related to the scan line to be processed next to the one scan line after the filling and clipping.

12. The drawing processing apparatus of claim 7, further comprising:
a vector storage section for storing the drawing vectors and the clip vectors prepared by said vector generation section.

13. The drawing processing apparatus of claim 7, further comprising:
a drawing attribute storage section for storing the correspondence table prepared by said drawing attribute processing section.

14. The drawing processing apparatus of claim 7, wherein
the correspondence table indicating which of the clip vectors each of the drawing vectors is clipped with is prepared before the filling and clipping are performed.

15. A drawing processing apparatus having a drawing instruction at least having a description instruction containing a text or a graphic form and a clip instruction for the description instruction and interpreting image data described in a predetermined description language, said drawing processing apparatus comprising:
means for inputting the drawing data;
drawing data processing means for representing an outline shape of the drawing instruction as vectors based on relationship with a scan line;
means for extracting order information based on a drawing instruction input order in said drawing data input means and correspondence information between the description instructions and the clip instructions for each drawing instruction;
means for preparing a drawing attribute table relating the drawing instructions and the correspondence information to each other based on the order information extracted by said extraction means;
vector extraction means for extracting all vectors of the drawing instruction related to a specific scan line based on said drawing attribute table preparation means; and
scan line processing means for converting the vectors extracted by said vector extraction means into a final image by one direct scanning along the scan line using the order information and the correspondence information related to the drawing instruction to which the vectors belong.

16. The drawing processing apparatus of claim 15, wherein
a vector having a start point corresponding to the scan line is related to the scan line.

17. The drawing processing apparatus of claim 15, wherein the vectors of the drawing instruction contain a vector of the description instruction and a vector of the clip instruction.

18. The drawing processing apparatus of claim 15, wherein
said scan line processing means comprises:
means for determining an intersection point of the vector and the scan line;
means for determining whether or not an area between the intersection points is to be filled toward the scanning direction based on the order information and the correspondence information for the intersection points for each scan line; and
means for filling the area between the intersection points based on a determination of said determination means.

19. The drawing processing apparatus of claim 18, wherein
said determination means comprises:
initial state determination means for determining whether or not an area between a scanning start point of the determination start scan line and the first intersection point is to be filled based on the order information and the correspondence information; and
state determination means for determining whether or not an area between the first intersection point and the next intersection point in the scanning direction of the determination start scan line is to be filled based on a determination of said initial state determination means, the order information, and the correspondence information.

20. The drawing processing apparatus of claim 15, wherein the final image is a bit map image.

21. The drawing processing apparatus of claim 15, wherein the final image is a run length output image.

22. A drawing processing method having a drawing instruction at least having a description instruction containing a text or a graphic form and a clip instruction for the description instruction and interpreting image data described in a predetermined description language, said drawing processing method comprising the steps of:

inputting the drawing data;

representing an outline shape of the drawing instruction as vectors based on relationship with a scan line;

extracting order information based on a drawing instruction input order in said drawing data input step and correspondence information between the description instructions and the clip instructions for each drawing instruction;

preparing a drawing attribute table relating the drawing instructions and the correspondence information to each other based on the order information extracted in said extraction step;

extracting all vectors of the drawing instruction related to a specific scan line based on the drawing attribute table preparation; and converting the vectors extracted in said vector extraction step into a final image by one direct scanning along the scan line using the order information and the correspondence information related to the drawing instruction to which the vectors belong.

* * * * *